(12) United States Patent
Cope

(10) Patent No.: US 12,020,567 B2
(45) Date of Patent: *Jun. 25, 2024

(54) MOTION DETECTORS

(71) Applicant: Opteran Technologies Limited, Sheffield (GB)

(72) Inventor: Alex Cope, Sheffield (GB)

(73) Assignee: Opteran Technologies Limited, Sheffield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,420

(22) Filed: Oct. 21, 2021

(65) Prior Publication Data

US 2022/0076574 A1    Mar. 10, 2022

Related U.S. Application Data

(63) Continuation of application No. 16/610,715, filed as application No. PCT/GB2018/051232 on May 8, 2018, now Pat. No. 11,170,646.

(30) Foreign Application Priority Data

May 5, 2017    (GB) ...................................... 1707247

(51) Int. Cl.
 G08G 1/123    (2006.01)
 H04N 9/31    (2006.01)
(52) U.S. Cl.
 CPC ........... *G08G 1/123* (2013.01); *H04N 9/3147* (2013.01)
(58) Field of Classification Search
 CPC .................................. G01D 1/18; G08B 29/18

USPC ......................................................... 340/994
See application file for complete search history.

(56) References Cited

U.S. PATENT DOCUMENTS

| | | | | |
|---|---|---|---|---|
| 6,229,439 | B1 * | 5/2001 | Tice | G01D 3/032 340/506 |
| 2008/0004796 | A1 * | 1/2008 | Schott | G01C 21/005 701/434 |
| 2008/0175309 | A1 * | 7/2008 | Fimoff | H04L 25/03019 375/232 |
| 2013/0012149 | A1 * | 1/2013 | Ben Ghalba | H03G 3/3078 455/226.1 |
| 2014/0169501 | A1 * | 6/2014 | Nazarathy | H03H 21/0012 375/316 |

FOREIGN PATENT DOCUMENTS

JP    H07006273    1/1995

OTHER PUBLICATIONS

JP Appln. 2019-560319, Decision to Refuse, JPO, 4pgs Sep. 13, 2022.
JP Appln. 2019-560319, Notice of Reasons for Rejection, JPO, 4 pgs. Mar. 29, 2022.

(Continued)

*Primary Examiner* — Fabricio R Murillo Garcia
(74) *Attorney, Agent, or Firm* — Gerald W. Roberts; Dentons Bingham Greenebaum LLP

(57) ABSTRACT

Examples relate to detectors for determining motion from visual cues, said determining being invariant to changes in at least one of temporal and spatial frequencies of said visual cues.

15 Claims, 13 Drawing Sheets

(56) References Cited

OTHER PUBLICATIONS

Cope et al., "A Model for an Angular Velocity-Tuned Motion Detector Accounting for Deviations in the Corridor-Centering Response of the Bee," PLoS Computational Biology, US Publich Library of Science, pp. 1-22 May 5, 2016.
Office Action issued by Korean Intellectual Property Office, Mar. 22, 2023 (regarding Korean Patent Application No. 10-2019-7033292, filed Nov. 11, 2019), 4 pgs (in Korean language), 5 pgs (English language translation).
Canadian Application No. 3,061,865, Office Action issued by Canadian Intellectual Property Office, Sep. 27, 2023, 7 pages.

* cited by examiner

MOTION DETECTORS

CROSS REFERENCE TO RELATED APPLICATIONS

This application is a continuation of U.S. patent application Ser. No. 16/610,715, filed on Nov. 4, 2019, which is a National Stage Entry of International Application No. PCT/GB2018/051232, filed on May 8, 2018, which claims the benefit of the priority of Great Britain Application No. 1707247.1, filed on May 5, 2017, the disclosures of all of which are hereby incorporated by reference in their entireties.

BACKGROUND

There is a rising interest in the use of small unmanned vehicles, or drones, in performing various tasks. Those tasks can comprise navigating an unknown environment. Any given environment may or may not have access to positioning signals such as, for example, Global Positioning Signals (GPS) for controlling or tracking a drone's position within that environment. In an area devoid of positioning signals or other references, a drone should be capable of operating autonomously within that environment with a view, in particular, to avoiding collisions with structures forming, or objects within, the given environment. Similarly, multiple drones operating within a common environment, either collectively as a swarm or independently, have a similar need for collision avoidance. To realise such collision avoidance, a drone would need to be aware of its environment, in particular, its motion within that environment.

BRIEF INTRODUCTION OF THE DRAWINGS

Figure 1:
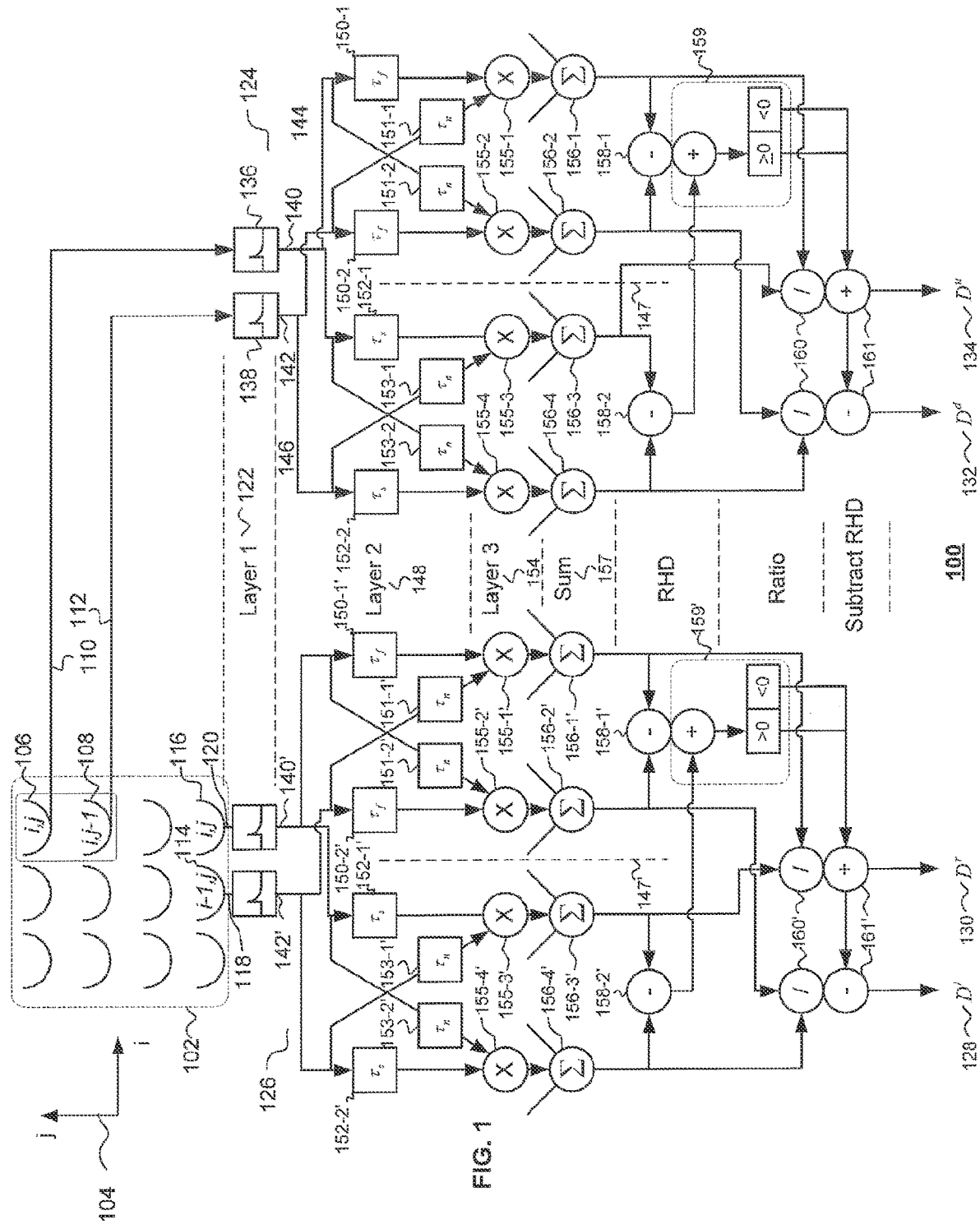
Figure 2:
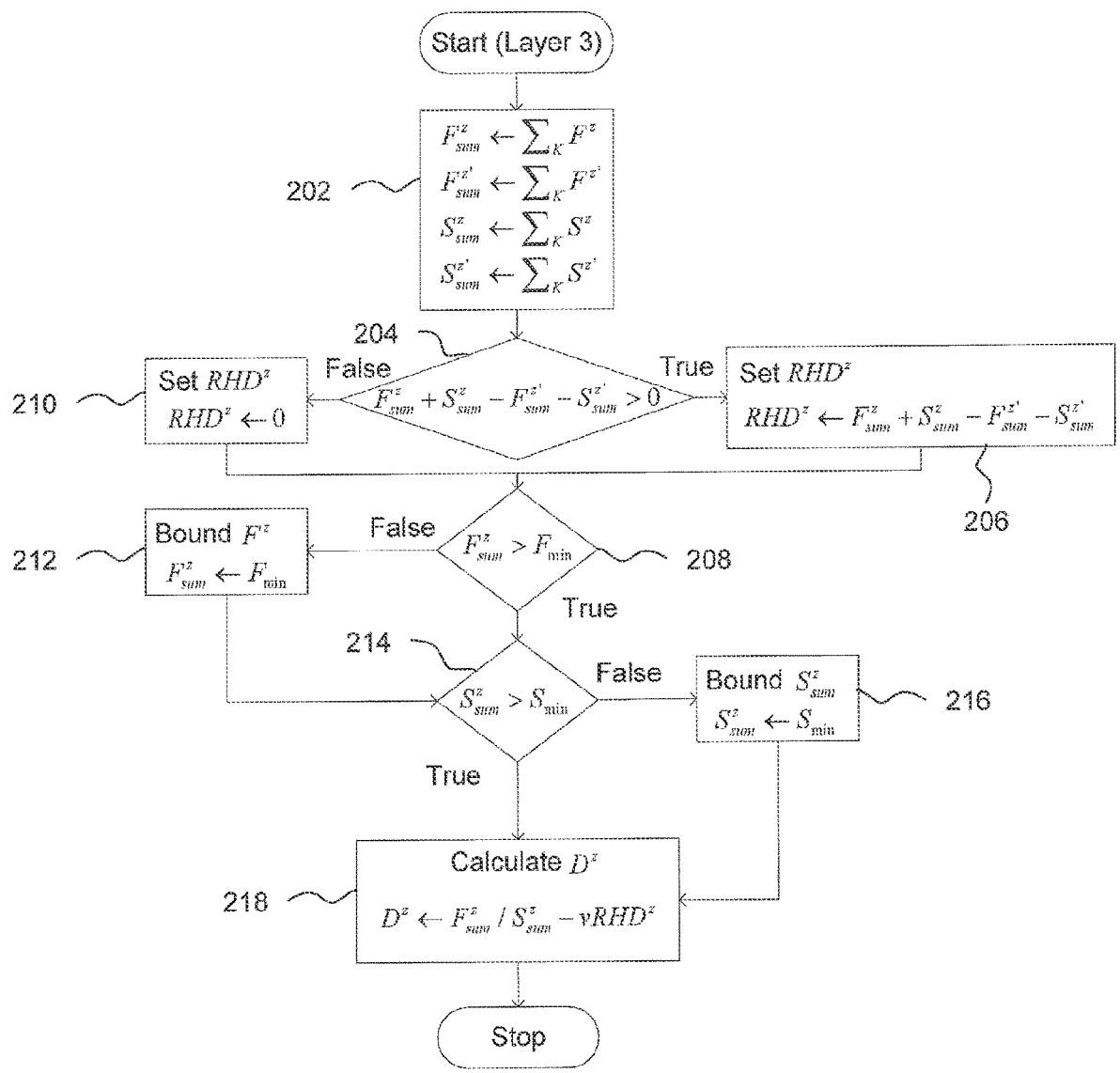
Figure 3:
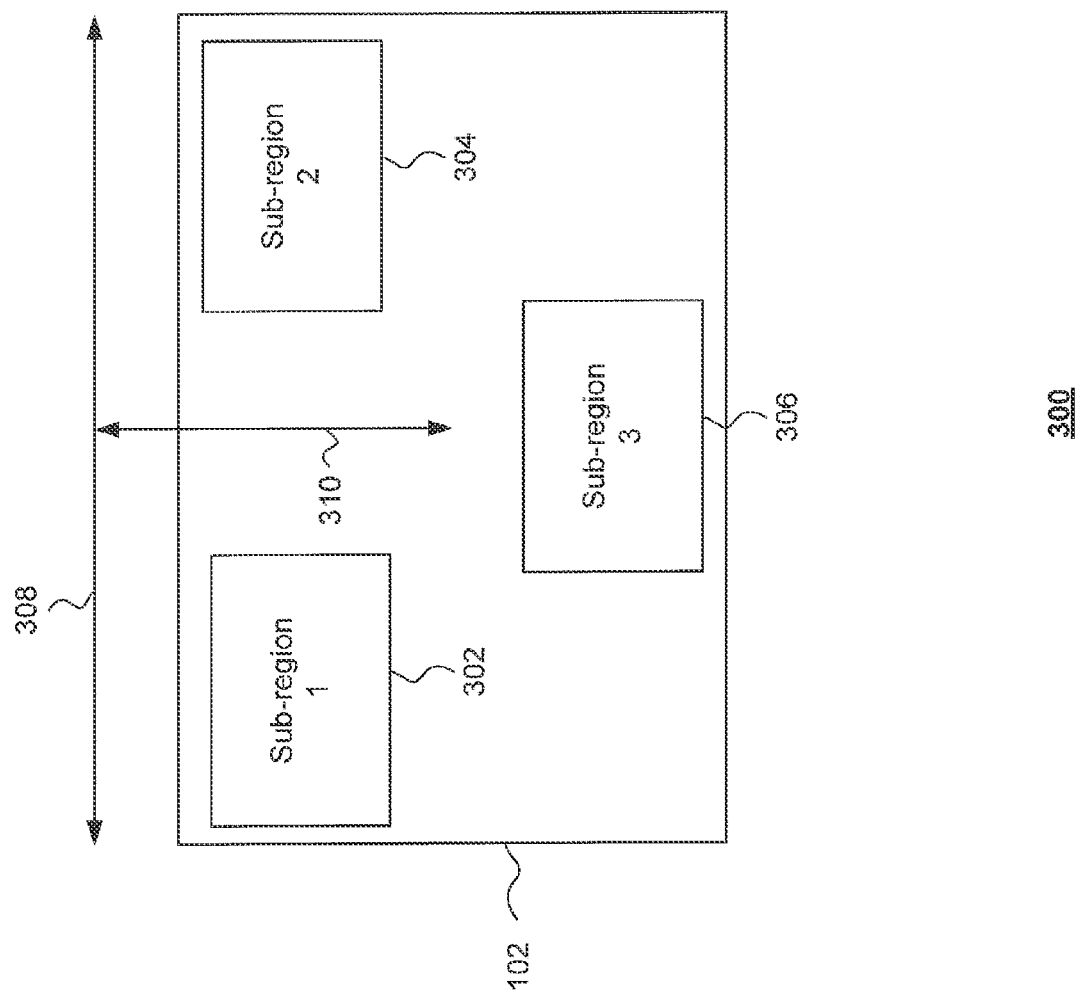
Figure 4:
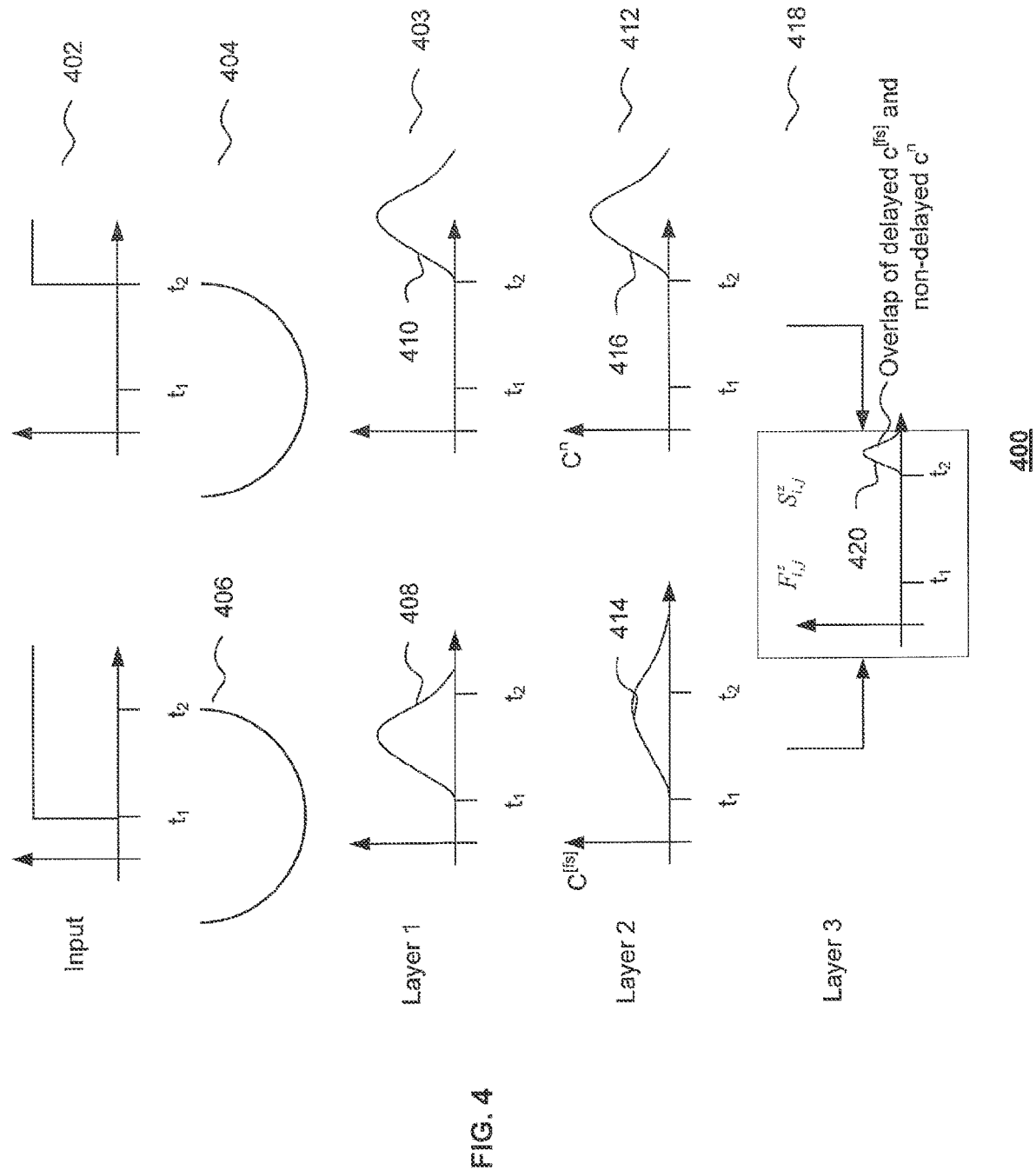
Figure 5:
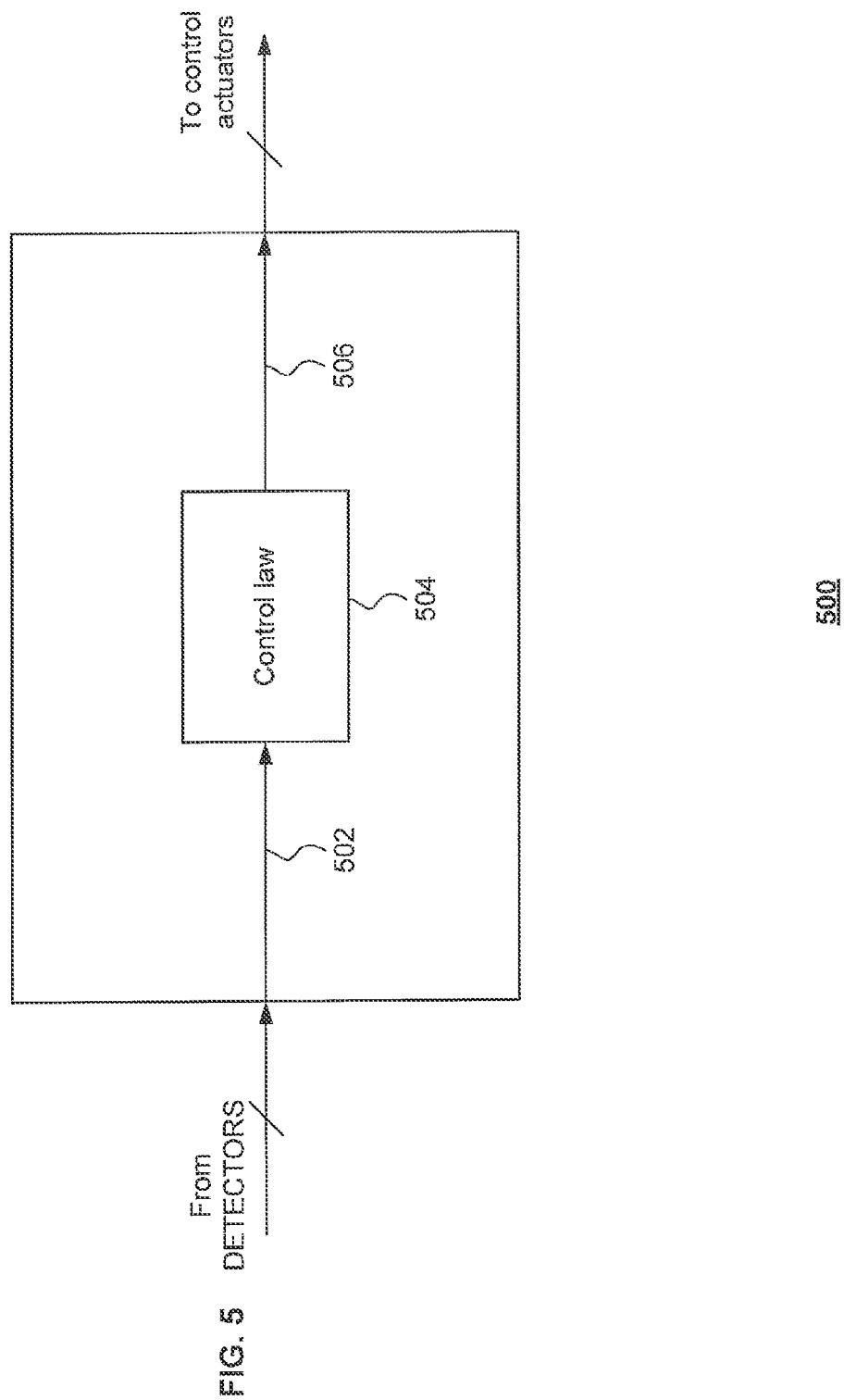
Figure 6:
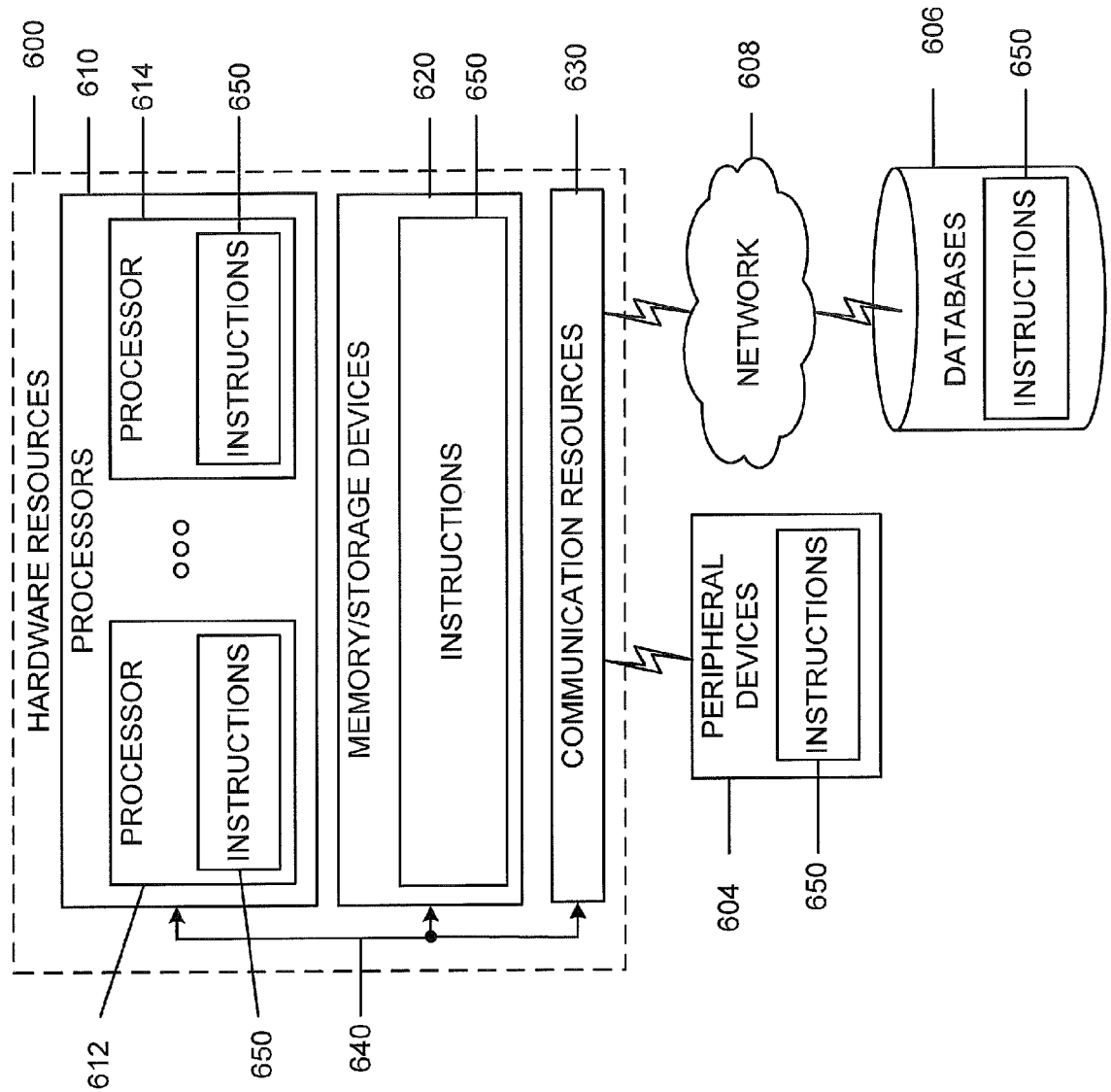
Figure 7:
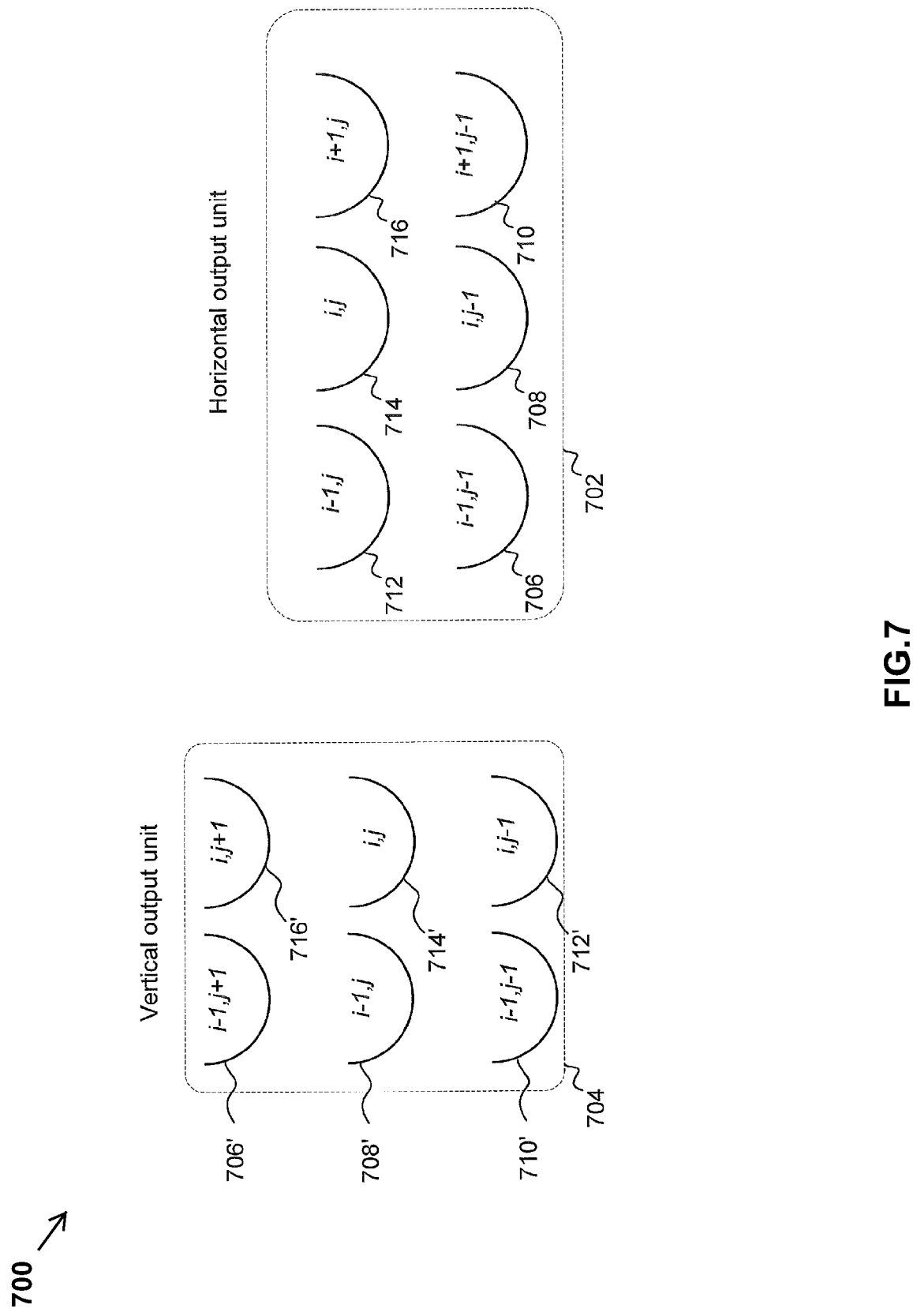
Figure 8:
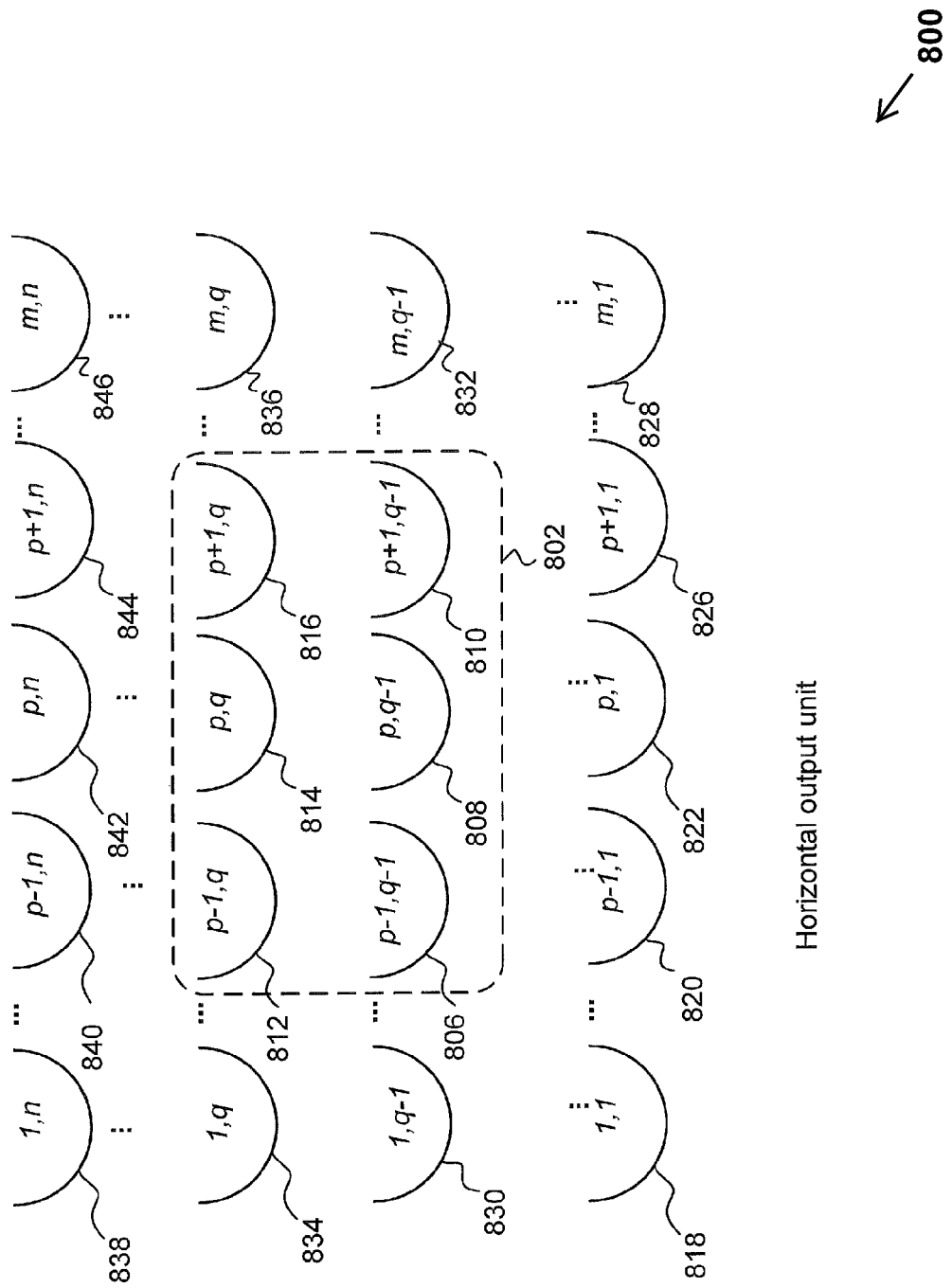
Figure 9:
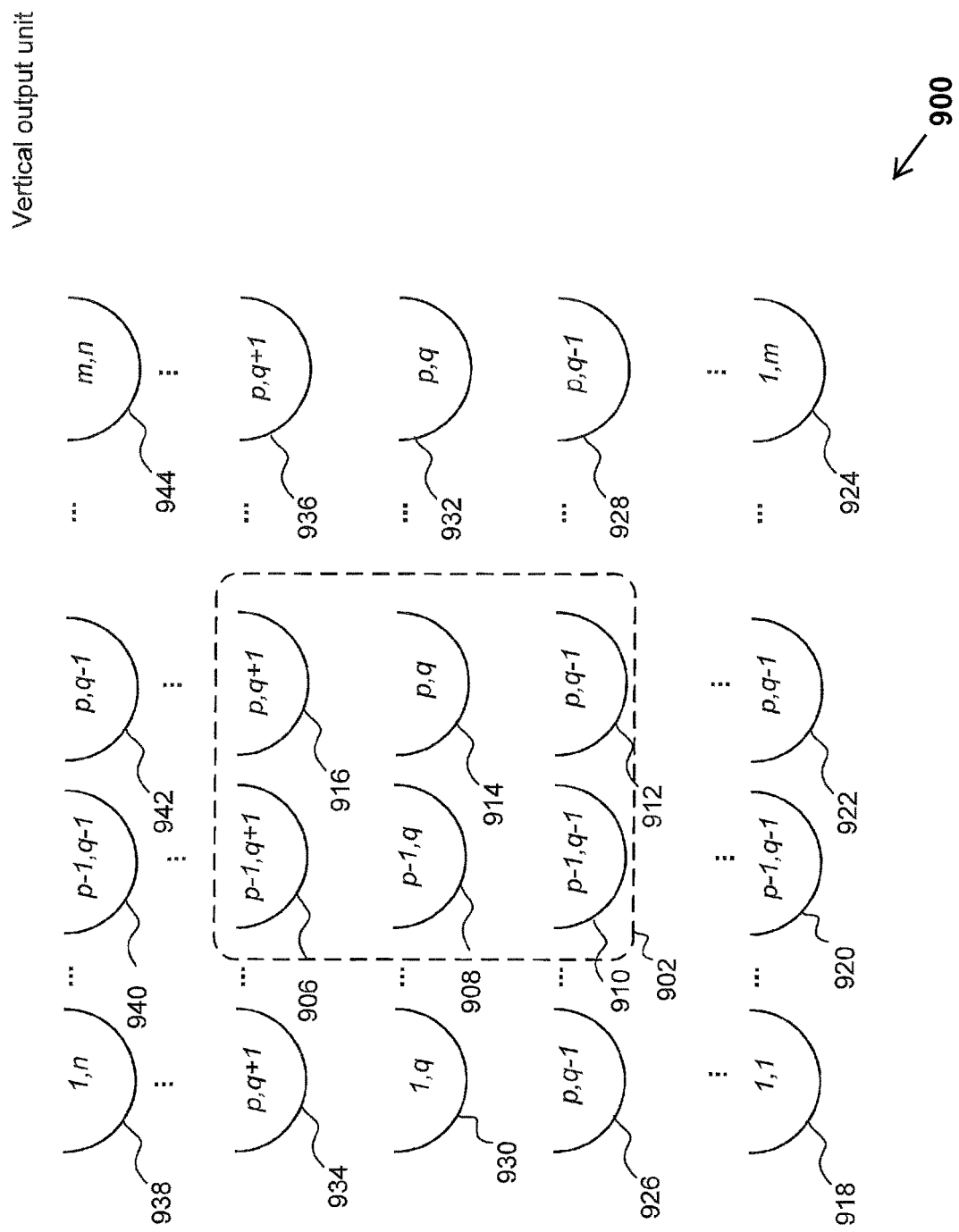
Figure 10:
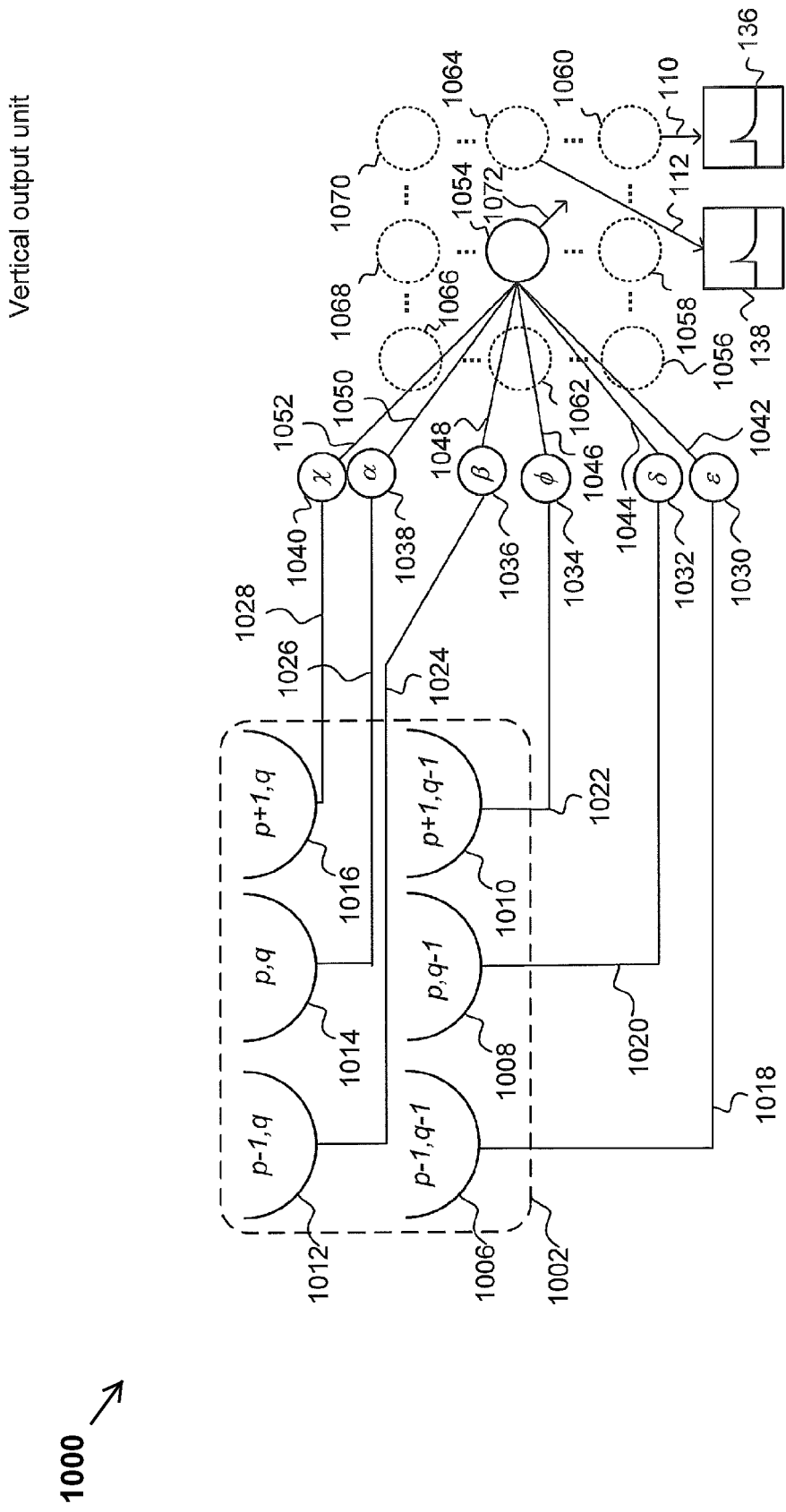
Figure 11:
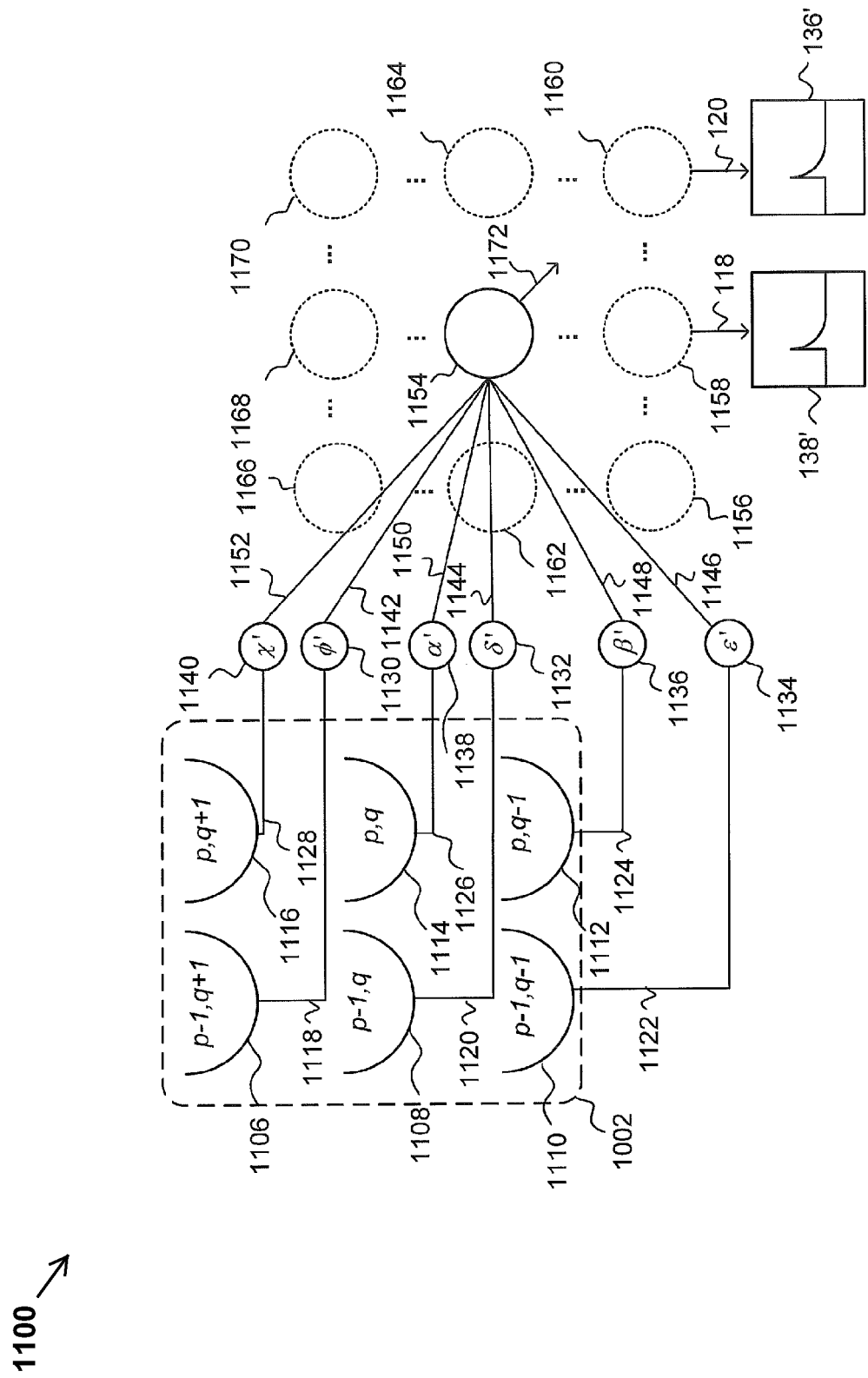
Figure 12:
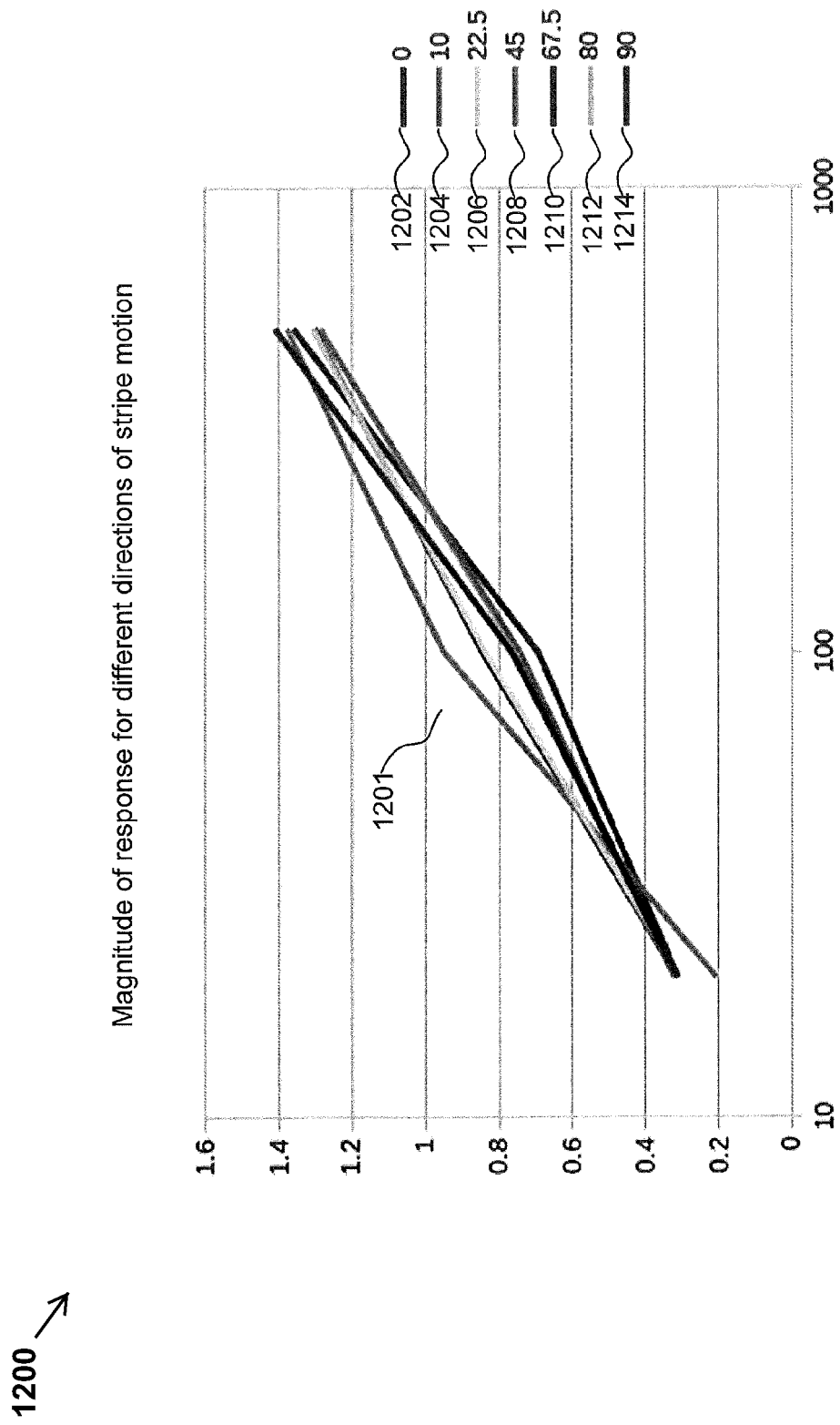
Figure 13:
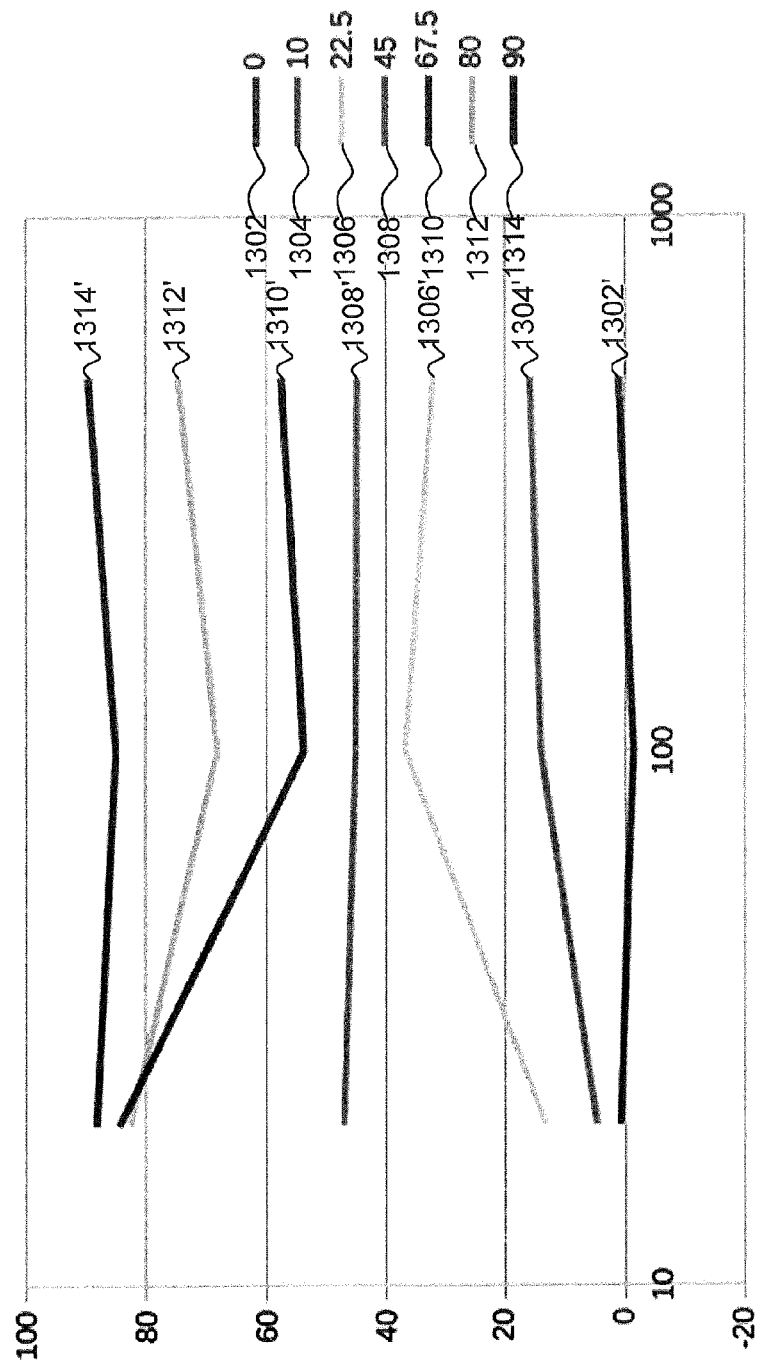

FIG. 1 shows a motion detector according to an example,
FIG. 2 illustrates a flow chart for motion detection according to an example,
FIG. 3 shows an array of sensors according to an example,
FIG. 4 shows a number of outputs according to an example,
FIG. 5 depicts schematically control circuitry according to an example,
FIG. 6 shows a processor and machine executable instructions or circuitry according to an example,
FIG. 7 illustrates horizontal and vertical output units according to examples,
FIG. 8 shows a horizontal output unit according to examples,
FIG. 9 depicts a vertical output unit according to examples,
FIG. 10 shows a horizontal output unit spatial filter according to examples,
FIG. 11 shows a vertical output unit spatial filter according to examples,
FIG. 12 depicts a performance graph of examples, and
FIG. 13 shows a performance graph of examples.

DETAILED DESCRIPTION

Accordingly, example implementations can provide a detector for detecting motion, the detector comprising: an input interface for receiving inputs from a plurality of sensors responsive to environmental changes such as, for example, changes in electromagnetic waves or sounds wave; processor circuitry, responsive to selected inputs of the plurality of inputs, comprising a first filter to produce a zero output in response to a steady state input of the selected inputs; a second filter, responsive to the output of the first filter, to produce an output that is equal to the output of the first filter in a steady state; correlator circuitry arranged to determine measures of temporally overlapping outputs from selected outputs of the second filter; ratio determining circuitry, responsive to outputs from the correlator circuitry, for determining a ratio of selected outputs from the correlator circuitry; said ratio being associated with at least one direction of motion.

Example implementations can be realised in which the first filter to produce a zero output in response to a steady state input of the selected inputs can comprising circuitry to solve or implement a first differential equation comprising different time constants using the selected inputs.

Example implementations can be realised in which the second filter, responsive to the output of the first filter, to produce an output that is equal to the output of the first filter in a steady state, responsive to the output of the first filter in a steady state comprises circuitry to solve or implement a second differential equation to produce the output that is equal to the output of the first filter in a steady state.

FIG. 1 shows a motion detector, such as, for example, an angular velocity detector 100, according to an example implementation. The detector 100 can receive one or more than one input from a respective sensor or sensors 102. In the example depicted, the sensors are photo-sensitive sensors for detecting visible light incident upon the sensor. The detector 100 shown is arranged to receive inputs from a plurality of such sensors, that is, to detect visible light or electromagnetic waves have wavelengths other than corresponding to visible light. The sensors 102 can be arranged in a number of ways. For example, the sensors 102 can be arranged as a 2D array, as shown. The sensors 102 in such an array can be indexed using two orthogonal axes 104 using i and J as the ordinate and abscissa indices respectively. The array can be realised as an n×m array. In the example illustrated, the array is a 3×4 array. It will be appreciated that n and m can take any suitable values and that they are not limited to 3 and 4. Furthermore, the array 102 shown is substantially planar. However, example implementations can be realised in which the array is non-planar such as, for example, spherical or some other non-linear or non-planar surface. Still further, the array is depicted with the sensors being linearly disposed relative to one another. However, the sensors can be arranged in some other manner such as, for example, in an offset manner where adjacent rows are offset relative to one another. Using offset sensors, or at least sensors that would not respond simultaneously to the same event such as the same transition, can smooth the response of the system to a common stimulus, which has the advantage that responses to sudden or sharp changes, such as, sudden or sharp light transitions, are damped or otherwise smoothed.

The outputs from adjacent pairs of sensors 102 are processed together. For example, a first pair of sensors 106 and 108, having indices i, j and i, j−1, is shown as having respective outputs 110 and 112. An example of a further pair of sensors 114 and 116 is also depicted. The further pair of sensors 114 and 116 have respective outputs 118 and 120.

The outputs 110, 112, 118, 120 can be carried or conveyed to the respective filters 136, 138, 136', 138' using a bus or other communication means. Such a bus or other communication means can constitute an input interface.

The outputs from each adjacent pair of vertically disposed sensors are input to a respective processor 124. The outputs from each adjacent pair of horizontally disposed sensors are input to a respective processor 126. The respective processors 124 and 126 are arranged to determine respective directions of motion along the j and i axes 104. In the example shown, the directions of motion are indicated using values indicative of left, right, up and down, that is, $D^l$, $D^r$, $D^u$ and $D^d$ 128 to 134 respectively.

A processor, such as processor 124, corresponding to a pair of vertically disposed sensors, comprises a number of filters. In the example shown, two such filters 136 and 138 are provided. The filters 136 and 138 are arranged to determine a level of activity, a, associated with a node; a node being synonymous with a sensor. The level of activity, a, is related to the variation in incident light. The filters 136 and 138 output the solution to a pair of differential equations. Examples implementations can be realised in which the differential equations are:

$$db_{i,j}/dt=(x_{i,j}-b_{i,j})/\tau_b \text{ and } da_{i,j}/dt=(x_{i,j}-a_{i,j}-b_{i,j})/\tau_a \quad (1)$$

where a is the level of activity of a node, as previously indicated, b is the adaptation activity of the node, x is the activity of the input point, that is, the variation in the incident light or other radiation, t is time and $\tau_a$ and $\tau_b$ are time constants. The time constants can be different. In the example shown, $\tau_b > \tau_a$, that is, the adaption value, b, has a slower time constant than the level of activity, a, which means that changes in the input will cause changes in a, but if the input does not change, the value of b will approach the value of a, and a will tend to zero due to the −b term in the differential equation for a. The outputs 140 and 142 from the filters 136 and 138 represent respective values for a. Furthermore, example implementations can be realised in which the output, a, from Layer 1 122 can be input into Layer 2 148 such that only positive values or negative values of Q are transmitted to layer 2, that is, onset edges or offset edges, that is, a dark to light transition and a light to dark transition respectively, or so that both positive and negative values are transmitted to layer 2. An edge can comprise a transition from a first light level to a second light level. The second light level can have a greater or lower intensity than the first light level. A transition from a first light level to a second, higher intensity, light level can constitute an onset edge. A transition from a first light level to a second, lower intensity, light level can constitute an offset edge. In essence, equation (1) operates as a light level transition detector or filter that detects changes in light level as opposed to absolute values.

It will be appreciated that the foregoing differential equations are invariant to any temporal and spatial contrast input variations. For example, considering a steady state non-zero input, the output from layer 1 122, that is, a, from a filter would be zero and the output of the detector 100 as a whole would also be zero, which would be as anticipated since the steady state would represent an absence of motion. Suitably, an absence of adaptation would lead to the output of layer 1, that is, a, being equal to the input.

The processor 124 comprises left and right branches 144 and 146 delineated by the vertical dashed line 147. The right branch 144 receives inputs from the outputs of the two filters 136 and 138. The processor 124 comprises a second layer 148. The second layer 148 comprises a number of types of nodes. In the example shown, the second layer comprises three types of node. In the example shown, the right branch 144 comprises a pair of fast nodes 150-1 and 150-2 and a pair of neutral nodes 151-1 and 151-2. The left branch 146 comprises a pair of slow nodes 152-1 and 152-2 and a pair of neutral nodes 153-1 and 153-2. The nodes 150 to 153 are arranged to compute solutions to the following differential equation:

$$dc_{i,j}^{[f,s,n]}/dt=(a_{i,j}-c_{i,j})\tau_{[f,s,n]} \quad (2)$$

where C is the activity of the node and the output from each node, a is the activity of the corresponding layer 1 node, t is time, and τ[fsn] are time constants such that $\tau_n < \tau_f < \tau_s$. It can be appreciated that the differential equation realizes low-pass filtering and the steady state is such that the output is equal to the input. It will be appreciated that equation (2) is, in fact, three equations when taking each of the super/sub-scripts n,f,S in turn. The low pass filter lengthens an input signal so that is can be used in a slow and fast correlation between the lengthened signal and the original signal, as described below with reference to FIG. 4. Example implementations can be realised in which $\tau_s$: $\tau_f$=3:1. For example, $\tau_s$=15 and $\tau_f$=5. Furthermore, example implementations can be realised in which $\tau_n$=1. Varying the values of $\tau_s$ or $\tau_f$ varies the response to the processors 124 and 126 to the changes in the input. For example, larger values either of $\tau_s$ or $\tau_f$ leads to a slower system response and/or at least one of a decrease in spatial or temporal resolution and visa versa. Outputs from each of the nodes 150 to 153 are respective values of c.

The processor 124 comprises a number of layer 3 154 nodes 155-1 to 155-4. The right branch nodes 155-1 and 155-2 are arranged to compute the following as outputs: $F_{i,j}^d=c_{i,j}^f c_{i,j-1}^n$ for node 155-1 and $F_{i,j}^u=c_{i,j-1}^f c_{i,j}^n$ for node 155-2, while the left branch nodes are arranged to compute the following as outputs: $S_{i,j}^u=c_{i,j-1}^s c_{i,j}^n$ for node 155-4, and $S_{i,j}^d=c_{i,j}^s c_{i,j-1}^n$ for node 155-3. It will be appreciated that one takes the nearest index in each of two directions per processor; namely, u=up (positive j), d=down (negative j) for processor 124, but alternatively, l=left (negative i) and r=right (positive i) for processor 126 from the layer 2 nodes superscripted n and multiplies the $c^f$ node outputs by the $c^n$ node outputs, and the $c^s$ node outputs by the $c^n$ node outputs as depicted by the cross or leaky input connections.

The values of $F_{i,j}^{[udlr]}$ represent the product, or correlation, of temporally overlapping delayed and non-delayed signals; the latter being represented by respective values of c. The [ . . . ] represents a value of $F_{i,j}$ for each superscript within the square brackets taken severally. The values of $F_{i,j}^{[udlr]}$ represent the product of temporally overlapping delayed and non-delayed signals; the latter being represented by respective values of c. The [ . . . ] represents a value of $s_{i,j}$ for each superscript taken severally. The products can be evaluated using a correlator or correlation circuitry arranged to determine measures, $F_{i,j}^{[udlr]}$ and $S_{i,j}^{[udlr]}$, of the temporally overlapping outputs.

The processor 124 comprises a plurality of nodes 156-1 to 156-4 in a fourth layer 157 that perform respective summations of inputs. The fourth layer 157 is shown as comprising four sublayers labelled "Sum", "Reichardt-Hassenstein implementation/detector (RHD)", "Ratio" and "Subtract RHD". The nodes in layer 4 157, in both of the processors 124 and 126, are arranged to realise the following computations:

$$RHD_K^z = \begin{cases} \sum_K F^z + \sum_K S^z - \sum_K F^{z'} - \sum_K S^{z'} & \text{if } \sum_K F^z + \sum_K S^z - \sum_K F^{z'} - \sum_K S^{z'} > 0 \\ 0 & \text{if } \sum_K F^z + \sum_K S^z - \sum_K F^{z'} - \sum_K S^{z'} \leq 0 \end{cases}$$

(3), which corresponds to the linear sum of two RHD; one for $F^z$ and one for $S^z$, $$D_N^z = \begin{cases} \sum_K F^z / \sum_K S^z - v \sum_K RHD^{z'} & \text{if } \sum_K F^z > \sum_K F_{min} \text{ and } S^r > S_{min} \\ \sum_K F_{min} / \sum_K S^z - v \sum_K RHD^{z'} & \text{if } \sum_K F^z \leq \sum_K F_{min} \text{ and } S^r > S_{min} \\ \sum_K F^z / \sum_K S_{min} - v \sum_K RHD^{z'} & \text{if } \sum_K F^z > \sum_K F_{min} \text{ and } S^r \leq S_{min} \\ \sum_K F_{min} / \sum_K S_{min} - v \sum_K RHD^{z'}, & \text{if } \sum_K F^z \leq \sum_K F_{min} \text{ and } S^r \leq S_{min} \end{cases} \quad (4)$$

where $z=\{u, d, l, r\}$ and $z'=\{d,u,r,l\}$ for any set of points $K=k_{aa}, k_{bb}, \ldots, k_{zz}$ selected from the array 102, and V is a scaling factor, $F_{min}$ and $S_{min}$ are lower bounds for a selected number, N, of sensor outputs. As will be discussed with reference to FIG. 3, the selected number of sensor outputs can correspond to one or more than sensor taken from any group of sensors constituting the array of sensors. Furthermore, example implementations can be realised in which v□1. Example implementations can be realised in which v=10. However, example implementations can be realised in which v=0. Additionally, or alternatively, example implementations can be realised in which $F_{min}$ and $S_{min}$ have a predetermined relationship such as, for example, $F_{min}=0.1\ S_{min}$. It will be appreciated that the choice of relationship between $F_{min}$ and $S_{min}$ is a balance between performance and the influence of noise. Similarly, although the scalar 0.1 has been used, examples are not limited thereto. Examples can be realised that use some other value to establish the relationship between $F_{min}$ and $S_{min}$. Decreasing the coefficient of $S_{min}$ increases the influence of noise and visa versa. Furthermore, it will be appreciated that the ratio of $F^z$ and $S^z$ is directionless. Therefore, to detect motion is a desired direction, motion in the opposite direction is subtracted from the ratio.

In detail, it can be appreciated that nodes 156-1 and 156-2 produce outputs
$\Sigma_K F^d$ and $\Sigma_K F^u$ respectively, and nodes 156-3 and 156-4 produce outputs
$\Sigma_K S^d$ and $\Sigma_K S^u$ respectively. Nodes 158-1 and 158-2 produce outputs
$\Sigma_K F^d - \Sigma_K F^{d'}$ and $\Sigma_K S^d - \Sigma_K S^{d'}$ respectively, or, more generally, $\Sigma_K F^z - \Sigma_K F^{z'}$ and $\Sigma_K S^z - \Sigma_K S^{z'}$ respectively. Node 159 realizes the whole of $$RHD_K^z = \begin{cases} \sum_K F^z + \sum_K S^z - \sum_K F^{z'} - \sum_K S^{z'} & \text{if } \sum_K F^z + \sum_K S^z - \sum_K F^{z'} - \sum_K S^{z'} > 0 \\ 0 & \text{if } \sum_K F^z + \sum_K S^z - \sum_K F^{z'} - \sum_K S^{z'} \leq 0 \end{cases}$$

Nodes 160 and 161 implement the whole of $$D_N^z =$$
$$\begin{cases} \sum_K F^z / \sum_K S^z - v \sum_K RHD^{z'} & \text{if } \sum_K F^z > \sum_K F_{min} \text{ and } S^r > S_{min} \\ \sum_K F_{min} / \sum_K S^z - v \sum_K RHD^{z'} & \text{if } \sum_K F^z \leq \sum_K F_{min} \text{ and } S^r > S_{min} \\ \sum_K F^z / \sum_K S_{min} - v \sum_K RHD^{z'} & \text{if } \sum_K F^z > \sum_K F_{min} \text{ and } S^r \leq S_{min} \\ \sum_K F_{min} / \sum_K S_{min} - v \sum_K RHD^{z'} & \text{if } \sum_K F^z \leq \sum_K F_{min} \text{ and } S^r \leq S_{min} \end{cases}$$

according the respective conditions being satisfied. For the processor 124, nodes 160 and 161 produce outputs 134 and 132, that are indicative of motion in the up and down directions, that is, in the j directions.

It can be appreciated that subtracting the $RHD_K^z$ or $RHD_K^{z'}$ term allows a directional output to be realised that has a limited response to angular velocity except in a predetermined or desired direction. Furthermore, taking the ratio via nodes 160 after the summation over the set of points K results in the outputs 1); being invariant to the size of a moving stimulus and, therefore, invariant to the spatial frequency of the stimulus, that is, the number of edges per unit angle. This follows because in the case of ratio then summation, the output will have the form $$\frac{F_1}{S_1} + \frac{F_2}{S_2} + \frac{F_3}{S_3} - C, \quad (5)$$

where C is the collected RHD terms,
whereas if the ratio is taken after summation, the output will have the form $$\frac{F_1 + F_2 + F_3}{S_1 + S_2 + S_3} - C, \quad (6)$$

where C is the collected RHD terms.

It can be appreciated that making all F equal and all S equal gives, from equation (6), a ratio that is the same as the individual ratios, whereas equation (5) gives a sum that is three times the individual ratio, which would result in a motion estimate being three times higher, which is inaccurate.

It can be seen that F and S tend to zero with higher angular velocities. Therefore, implementing lower bounds in the form of $F_{min}$ and $S_{min}$ with a fixed ratio ensures that the response to the detector to very high speed motion, and, therefore, noise, is reduced and preferably minimized. Suitably, noise in the detector can be at least reduced, and preferably minimized, by implementing a differential equation acting on the one or more than one of the detector outputs 128 to 134 with a form identical to equation (1) above.

Referring to processor 126, which is identical in construction and operation to processor 124 with the exception that the inputs to the processor 126 are taken from horizontally disposed sensors. The horizontally disposed sensors can be adjacent sensors such as, for example, sensors 114 and 116. Reference numerals used with reference to elements of processor 126 are identical to those used with reference to processor 124 with the addition of a dash or prime, ', and will not be described in detail. It can be appreciated, however, that the processor 126 comprises a number of layer 3 154 nodes 155-1' to 155-4'. The right branch nodes 155-1' and 155-2' are arranged to compute the following as outputs: $F_{i,j}^l = c_{i,j}{}^f c_{i-1,j}{}^n$ for node 155-1', and $F_{i,j}^r = c_{i-1,j}{}^f c_{i,j}{}^n$ for node 155-2', while the left branch nodes are arranged to compute the following as outputs: $S_{i,j}^r = c_{i,j}{}^s c_{i-1,j}{}^n$ for node 155-3', and $S_{i,j}^r = c_{i-1,j}{}^s c_{i,j}{}^n$ for node 155-4', and nodes 161' are arranged to produce outputs 128 and 130, which are indicative of left and right motion, that is, indicative of motion in the i directions.

Referring to FIG. 2, there is shown a flowchart 200 for implementing the above, in particular, for processing the output from layer 3 and culminates in producing the direction of motion outputs 128 to 134. It will be appreciated, however, that the other layers, such as, for example layers 1, 2 and 3, can equally well be included in the flow chart before section 202. At stage 202, a number of variables or calculations are optionally performed in advance. It can be appreciated that the following are, or can be, established:

$$F_{sum}^z \leftarrow \Sigma_K F^z,$$

$$F_{sum}^{z'} \leftarrow \Sigma_K F^{z'},$$

$$S_{sum}^z \leftarrow \Sigma_K S^z, \text{ and}$$

$$S_{sum}^{z'} \leftarrow \Sigma_K S^{z'}.$$

A determination is made, at 204, regarding whether or the condition $F_{sum}^z + S_{sum}^z - F_{sum}^{z'} - S_{sum}^{z'} > 0$ is satisfied. If the determination at 204 is true, the following is performed $RHD^z \leftarrow F_{sum}^z + S_{sum}^z - F_{sum}^{z'} - S_{sum}^{z'}$ at 206, then control passes to a further determination at 208. If the determination at 204 is false, the following is performed $RHD^z \leftarrow 0$ at 210 then control passes to the further determination 208.

At 208, it is determined whether or not condition $F_{sum}^z > F_{min}$ is satisfied. If it is determined at 208 that the condition is false, processing proceeds to 212, at which $F_{sum}^z \leftarrow F_{min}$ is performed, then processing proceeds to 214. If it is determined at 208 that the condition is true, processing proceeds to 214.

At 214, a determination is made regarding whether or not the condition is $S_{sum}^z > S_{min}$ satisfied. If the condition is not satisfied, control passes to 216, where $S_{sum}^z \leftarrow S_{min}$ is evaluated, then control passes to 218. If the determination at 214 is true, control passes to 218.

At 218, the directions of motion are calculated as follows:

$$D^z \leftarrow F_{sum}^z / S_{sum}^z - vRHD^z.$$

Thereafter, an optional further stage of processing is to apply equation (1) to the directions of motion to reduce noise, or to reduce the effect of noise, in the outputs $D^z$.

FIG. 3 shows a view 300 of the array of sensors 102. The outputs from the sensors of the array form the inputs to the processors 124 and 126. Those outputs can be taken from all of the sensors in the array or from a sub-set of the sensors in the array. The sub-set of sensors can form a contiguous array or sub-region of the total number of sensors. The example depicted in FIG. 3 shows a plurality of sub-regions 302 to 306. A sub-region may have a specific function or can be associated with a processor having a particular purpose. A sub-region can be associated with determining motion in a given direction. For example, a first sub-region 302 can be associated with determining motion in a respective direction along a first axis 308 or a different axis. A second sub-region 304 can be associated with determining motion in a respective direction along a respective axis, such as the first axis 308. A third sub-region 306 can be associated with determining motion in a respective direction along a respective axis, such as, for example, the axis 310. The axes 308 and 310 can be mutually orthogonal. Further or fewer sub-regions can be provided. A single sub-region can be used to determine directions of motion in a plurality of directions.

For example, a single sub-region, or other set of sensors of the array, can be used to determine motion in at least one of leftward, rightward, upward or downward directions taken jointly and severally in any and all permutations. The sensors used as inputs to processors 124 and/or 126 can be contiguously or discontiguously disposed.

Referring to FIG. 4, there is shown a number of views 400 of the inputs and outputs associated with the various layers described with reference to FIG. 1. It can be appreciated that an input such as, for example, a step input 402, indicative of an event such as, for example, an edge passing two sensors 404 and 406, at times $t_1$ and $t_2$ is shown. The responses 403 of the layer 1 filters 136, 138, 136', 138', that is, outputs 140, 142 and 140' and 142' are shown as respective curves 408 and 410, which are, again, at times $t_1$ and $t_2$. The outputs 412 of layer 2, that is, values of $c^{[fs]}$ and $c''$ are shown in curves 414 and 416 respectively. The two curves are multiplied in layer 3, which results in the output 418, that is, a curve 420 representing the overlap of delayed $c^{[fs]}$ and non-delayed $c''$, that is, $F_{i,j}^z$ and $S_{i,j}^z$.

Referring to FIG. 5, there is shown an implementation of a control system 500 that is responsive to the one or more than one of the outputs 128 to 134. The control system 500 comprises a number of inputs 502 for receiving the outputs 128 to 134. The control system 500 uses the inputs 502 in implementing a control law 504. The control law 504 can result in one or more than one control output 506. The control output 506 can comprise a single control signal or a plurality of control signals; the latter being indicated by the solidus. The control law 504 can comprise a single control law, in the form of, for example, an equation or set of equations, or multiple control laws, each comprising, for example, one or more than one respective equation responsive to the one or more than one input 502. The one or more control signals can be output for driving or controlling respective actuators for controlling motion of a vehicle.

The example implementations can be used to realise at least one of a speed, direction or attitude control system of a vehicle such as an unmanned vehicle, taken jointly and severally in any and all permutations. Such vehicles are not limited to unmanned vehicles. Manned vehicles can also use the example implementations described and claimed herein.

Referring to FIG. 6, there is shown is a block diagram illustrating components, according to some examples, able to read instructions from a machine-readable storage or computer-readable medium (e.g., a machine-readable storage medium) and perform any one or more of the methodologies discussed herein. The machine-readable storage or computer-readable medium can be non-transitory. Specifically, FIG. 6 shows a diagrammatic representation of hardware resources 600 including one or more processors (or processor cores) 610, one or more memory/storage devices 620, and, optionally, one or more communication resources 630, each of which are communicatively coupled via a bus 640.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), another type of processor, or any suitable combination thereof) may include, for example, a processor 612 and a processor 614, which may be implementations of processors 124 and 126. The memory/storage devices 620 may include main memory, disk storage, or any suitable combination thereof.

The communication resources 630 may include interconnection and/or network interface components or other suitable devices to communicate with one or more peripheral devices 604 and/or one or more databases 606 via a network 608. For example, the communication resources 630 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 650 may comprise machine executable instructions such as, for example, software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 and/or the databases 606. Accordingly, the memory of processors 610, the memory/storage devices 620, the peripheral devices 604, and the databases 606 are examples of computer-readable and machine-readable media.

Example implementations of the detector can accurately measure angular velocity in a direction for moving edges whose motion direction is perpendicular to the detector array. It can be appreciated that it would be increasingly challenging to detect motion tending towards being parallel to an edge. Furthermore, if motion, and, therefore, motion detection, in two dimensions is required, there are potential issues for edges that are not aligned to one of the detector axes. It will be appreciated that when the edge is parallel to one axis, all points on the edge cross the other axis at the same time. Therefore, there is no temporal delay between adjacent points, and thus no detector response. As an edge rotates from parallel to the one axis, there is a temporal delay between the edge crossing adjacent points on the other axis that varies with the degree of rotation or angle. It will be appreciated that the temporal delay tends to zero as the edge tends toward being parallel with the axis. The delay can be detected or interpreted as motion, which would be a correct detection for the signals received but not necessarily for, or indicative of, motion of a corresponding edge. However, examples can be realised that make an assumption that the motion is inclined at a predetermined angle relative to a detection axis of the detector, in particular, examples can be realised in which it is assumed that the detection signals correspond to motion that is perpendicular to the edge. Therefore, it can be appreciated that this assumption creates motion illusions in rotating spirals for humans. Appling this to example implementations described and claimed herein, it will be appreciated that detection of an edge angle is useful together with using that information in weighting received or detected signals from the sensors.

Therefore, referring to FIG. 7, there is shown a view 700 of a horizontal output unit 702 and a vertical output unit 704. The output units are grouped or associated sensors.

The grouped or associated sensors form or correspond to a sub-region of, or selected from, the overall sensor array. Alternatively, or additionally, the grouped or associated sensors can form the whole of the array.

Referring to the horizontal output unit 702, it comprises a predetermined number of sensors 706 to 716. The predetermined number of sensors 706 to 716 can be arranged in a predetermined manner. The predetermined manner can comprise an m by n array. In the example illustrated, the sensors 706 to 716 of the horizontal output unit are arranged in a 3 by 2 array. The horizontal output unit 704 comprises a reference sensor. The position of other sensors in the array can be determined relative to the reference sensor. In the illustrated embodiment, the reference sensor is sensors 714, but could equally well be any other sensor. The sensors 706 to 716 are indexed using (i, j) coordinates measured relative to the reference sensors 714. It can be appreciated that the reference sensor 714 has corresponding indices or coordinates (i, j). The other sensors 706 to 712 and 716 have the following corresponding indices or coordinates (i−1, j−1) (i, j−1) (i+1, j−1) (i−1, j) and (i+1, j).

Referring to the vertical output unit 704, it comprises a predetermined number of sensors 706' to 716'. The predetermined number of sensors 706' to 716' can be arranged in a predetermined manner. The predetermined manner can comprise an p by q array. In the example illustrated, the sensors 706' to 716' of the vertical output unit are arranged in a 2 by 3 array. The vertical output unit 704 comprises a reference sensor. The position of other sensors in the array can be determined relative to the reference sensor. In the illustrated embodiment, the reference sensor is sensors 714', but could equally well be any other sensor. The sensors 706' to 716' are indexed using (i, j) coordinates measured relative to the reference sensors 714'. It can be appreciated that the reference sensor 714' has corresponding indices or coordinates (i, j). The other sensors 706' to 712' and 716' have the following corresponding indices or coordinates (i−1, j+1) (i−1, j) (i−1, j−1) (i, j−1) and (i, j+1).

Therefore, the examples described above and depicted in FIGS. 1 to 5 can be modified to add a spatial filter prior to any initial temporal filtering stage. A single additional spatial filter can use used for each of the axes used in an implementation. Therefore, in the embodiment illustrated, two such spatial filters are used; one for motion in a first direction or for an axis in the first direction and one for motion in a second direction or for an axis in the second direction. In the example shown, the first and second directions or axes can correspond to horizontal and vertical directions or axes, but could be some other direction or axis, such as a z-direction, assuming that the horizontal and vertical axes are x and y axes or directions. Examples can be realised in which the spatial filter is a convolutional filter comprising a weighted sum of sensor outputs. Therefore, for the horizontal and vertical output units depicted, the spatial filter comprises a weighted sum of the predetermined number of sensors 706 to 716 and/or 706' to 716'.

Example implementations can be realised in which the output from spatial filter for the horizontal output unit is given by:

$$(x\_o\_h, y\_o\_h) = (x\_i, y\_j)*0.5 + (x\_i-1, y\_j)*0.25 + (x\_i+1, y\_j)*0.25 - (x\_i, y\_j-1)*0.5 - (x\_i-1, y\_j-1)*0.25 - (x\_i+1, y\_j-1)*0.25, \quad (7)$$

where
- (x_i,y_j) is the output from the sensor with indices (i, j)
- (x_i−1,y_j) is the output from the sensor with indices (i−1, j)
- (x_i+1,y_j) is the output from the sensor with indices (i+1, j)
- (x_i,y_j−1) is the output from the sensor with indices (i, j−1)
- (x_i−1,y_j−1) is the output from the sensor with indices (i−1, j−1) and
- (x_i+1,y_j−1) is the output from the sensor with indices (i+1, j−1).

Additionally, or alternatively, example implementations can be realised in which the output from the spatial filter for the vertical output unit is given by:

$$(x\_o\_v, y\_o\_v) = (x\_i, y\_j)*0.5 + (x\_i, y\_j-1)*0.25 + (x\_i, y\_j+1)*0.25 - (x\_i-1, y\_j)*0.5 - (x\_i-1, y\_j-1)*0.25 - (x\_i-1, y\_j+1)*0.25, \quad (8)$$

where
- (x_i,y_i) is the output from the sensor with indices (i,j)
- (x_i,y_i−1) is the output from the sensor with indices (i,j−1)
- (x_i,y_i+1) is the output from the sensor with indices (i,j+1)
- (x_i−1,y_i) is the output from the sensor with indices (i−1,j)
- (x_i−1,y_i−1) is the output from the sensor with indices (i−1,j−1) and
- (x_i−1,y_i+1) is the output from the sensor with indices (i−1,j+1).

Although the above example implementations have used the specified single edge detectors indicated in equations (7) and (8), example are not limited to those detectors.

Example implementations can be realised that use some other type of edge detector to detect motion perpendicular to a given axis of the detector or to detect motion having a component that is perpendicular to a given axis of the detector.

Example implementations can be realised in which the weightings or coefficients used in equations (7) and (8) can take other values such that the general, the outputs from the horizontal and vertical spatial filter outputs can be $$(x\_o\_h, y\_o\_h) = (x\_i, y\_j)\alpha + (x\_i-1, y\_j)\beta + (x\_i+1, y\_j)\chi - (x\_i, y\_j-1)\delta - (x\_i-1, y\_j-1)\varepsilon - (x\_i+1, y\_j-1)\phi \quad (9)$$

and $$(x\_o\_v, y\_o\_v) = (x\_i, y\_j)\alpha' + (x\_i, y\_j-1)\beta' + (x\_i, y\_j+1)\chi' - (x\_i-1, y\_j)\delta' - (x\_i-1, y\_j-1)\varepsilon' - (x\_i-1, y\_j+1)\phi'. \quad (10)$$

The values of $\alpha, \beta, \chi, \delta, \varepsilon, \phi$ can correspond to those given above with reference to equation (7) but could equally well take other values. The values of $\alpha', \beta', \chi', \delta', \varepsilon', \phi'$ can correspond to those given above with reference to equation (8) but could equally well take other values.

A horizontal output unit is arranged to feed a respective vertical detector, that is, vertical processor, and a vertical output unit is arranged to feed a respective horizontal detector, that is, horizontal processor. Therefore, referring to FIG. 1, a horizontal output unit is arranged to feed or output its signals to a respective vertical processor such as vertical processor 124 via spatial filers 136 and 138. Similarly, a vertical output unit is arranged to feed or output its signal detector to a respective horizontal processor such as horizontal processor 126 via spatial filters 136' and 138'. The arrangement of a horizontal output unit being arranged to feed a respective vertical detector, that is, vertical processor, and a vertical output unit being arranged to feed a respective horizontal detector, that is, horizontal processor follows because each should respond to edges at a predetermined angle such as, for example, perpendicular, to a given detector direction. Although the examples have been described with reference to the above spatial filters, other spatial filters can be used that provide responses to transitions or edges perpendicular to a given direction or axis.

Referring to FIG. 1, the horizontal and vertical output units can operate as feeds or outputs to the vertical 124 and horizontal 126 processors by taking the outputs from the sensors, processing the received signals and forwarding the spatially filtered outputs into one or more than one of filters 136, 138, 136', 138', taken jointly and severally in any and all permutations.

Referring to FIG. 8, there is shown a view 800 of a horizontal output unit 802, such as, the above described horizontal output unit 702, within the context of the array of sensors 102. It can be appreciated that the array of sensors 102 comprises an m by an array of sensors 806 to 846, where m and m are integers. The horizontal output unit 802 comprises 6 sensors 806 to 816, corresponding to sensors 706 to 716 of FIG. 7. It will be appreciated that the sensors 806 to 816 of the array 802 have been labeled with indices (p,q) rather than (i,j).

All, or at least a sub-set, of the sensors 806 to 846 are grouped into respective horizontal output units comprising respective sets of 6 sensors. Each set of sensors of a horizontal output unit provides output signals to respective weights as will be described with reference to FIG. 10.

Referring to FIG. 9, there is shown a view 900 of a vertical output unit 902, such as, the above described vertical output unit 702, within the context of the array of sensors 102. It can be appreciated that the array of sensors 102 comprises an m by n array of sensors 906 to 946, where m and m are integers. The vertical output unit 902 comprises 6 sensors 906 to 916, corresponding to sensors 706' to 716' of FIG. 7. It will be appreciated that the sensors 906 to 916 of the array 902 have been labeled with indices (p,q) rather than (i,j).

All, or at least a sub-set, of the sensors 906 to 946 are grouped into respective vertical output units comprising respective sets of 6 sensors. Each set of sensors of a horizontal output unit provides output signals to respective weights as will be described with reference to FIG. 11.

Referring to FIG. 10, there is shown a view of a horizontal output unit 1002 such as, for example, the above described horizontal output unit 802. The horizontal output unit comprises 6 respective sensors 1006 to 1016. Each sensor provides a respective output signal 1018 to 1028 to respective weighting units 1030 to 1040. The weighting units 1030 to 1040 weight their respective input signals using the above weights, $\alpha, \beta, \chi, \delta, \varepsilon, \phi$, to produce respective weighted output signals 1042 to 1052. For each horizontal output unit 1002, the respective weighted output signals 1042 to 1052 are summed using a respective adder such as, for example, respective adder 1054. An adder is provided for each horizontal output unit. Therefore, example implementations provide an array of respective adders 1054 to 1070. Each adder has a respective output signal 1072 that outputs the weighted summation described above by equation (7). As described above with reference to FIG. 1 with respect to pairs of vertically disposed sensors such as, for example, sensors 106 and 108, the adders are similarly grouped into vertically disposed pairs of adders. Each pair of vertically disposed adder is arranged to output their respective output signals to respective spatial filters 136 and 138 associated with a vertical processor 124. Therefore, for example, the outputs from adders 1060 and 1064, assuming that they are adjacent in the way that sensors 106 and 108 are adjacent, have respective output signals that feed respective spatial filters, that is, the adder output signals form or correspond to signals 110 and 112 that provide inputs into respective spatial filters 136 and 1038 as described above with reference to FIG. 1. Thereafter, the output signals 140 and 142 are processed as described above.

Referring to FIG. 11, there is shown a view of a vertical output unit 1102 such as, for example, the above described vertical output unit 902. The vertical output unit comprises 6 respective sensors 1106 to 1116. Each sensor provides a respective output signal 1118 to 1128 to respective weighting units 1130 to 1140. The weighting units 1130 to 1140 weight their respective input signals using the above weights, $\alpha', \beta', \chi', \delta', \varepsilon', \phi'$, to produce respective weighted output signals 1142 to 1152. For each vertical output unit 1102, the respective weighted output signals 1142 to 1152 are summed using a respective adder such as, for example, respective adder 1154. An adder is provided for each horizontal output unit. Therefore, example implementations provide an array of respective adders 1154 to 1170. Each adder has a respective output signal 1172 that outputs the weighted summation described above by equation (7). As described above with reference to FIG. 1 with respect to pairs of horizontally disposed sensors such as, for example, sensors 116 and 118, the adders are similarly grouped into vertically disposed pairs of adders. Each pair of horizontally disposed adders is arranged to output their respective output signals to respective spatial filters 136' and 138' associated with a horizontal processor 126. Therefore, for example, the outputs from adders 1158 and 1160, assuming that they are adjacent in the way that sensors 116 and 118 are adjacent, have respective output signals that feed respective spatial filters, that is, the adder output signals form or correspond to signals 118 and 120 that provide inputs into respective spatial filters 136' and 138' as described above with reference to FIG. 1. Thereafter, the output signals 140' and 142' are processed as described above.

It will be appreciate that example implementations use a set of adders per horizontal output unit and a set of adders per vertical output unit. Example implementations can be realised in which the sensors form an m by n array and the adders form respective m by n arrays.

It general, the mapping between the sensor array and the array of adders is as follows for a vertical output unit:

assume a vertical output unit having bottom left indices of (1,1) and top right indices of (2,3), the outputs of the 6 sensors corresponding to the sub-array of sensors defined by those indices would be mapped to a respective adder with indices (1,2), assume a next horizontally disposed vertical output unit having bottom left indices (2,1) and top right indices of (3,3), the outputs of the 6 sensors corresponding to the sub-array of sensors defined by those indices would be mapped to a respective adder with indices (2,2), assume a next vertically disposed vertical output unit having bottom left indices (1,2) and top right indices of (2,4), the outputs of the 6 sensors corresponding to the sub-array of sensors defined by those indices would be mapped to a respective adder with indices (1,3).

In general, the mapping of a vertical output unit having reference indices of (i, j) would map to an adder having indices of (i−1, j).

It general, the mapping between the sensor array and the array of adders is as follows for a horizontal output unit:

assume a horizontal output unit having bottom left indices of (1,1) and top right indices of (3,2), the outputs of the 6 sensors corresponding to the sub-array of sensors defined by those indices would be mapped to a respective adder with indices (2,2), assume a next horizontally disposed horizontal output unit having bottom left indices (2,1) and top right indices of (4,2), the outputs of the 6 sensors corresponding to the sub-array of sensors defined by those indices would be mapped to a respective adder with indices (3,2), assume a next vertically disposed horizontal output unit having bottom left indices (1,2) and top right indices of (3,3), the outputs of the 6 sensors corresponding to the sub-array of sensors defined by those indices would be mapped to a respective adder with indices (2,3).

Additionally, or alternatively, to the foregoing, it will be appreciated that the filters described by equations (7) to (10) are directional such that a given transition, such as, for example, an onset edge, in a respective direction, such as, for example, a positive axis direction, will produce a response to an opposite or complementary transition, such as, for example, an offset edge in the same respective direction. Therefore, the first temporal filtering layer, that is, layer 1 122, can output both positive and negative changes in response to transitions. However, it will be appreciated that these will be treated differently. In insects, there are separate pathways for onsets (positive changes) and offsets (negative changes). This is due to neurons not being able to express both positive and negative numbers at the same time. However, within example implementations, expressing both positive and negative numbers at the same time is possible. Therefore, example implementations can be realised in which positive and negative changes are processed to prevent them from interacting with one another at the multiplication stages of the processors 124/126 to prevent loss of, or adverse consequences for, a predetermined response to angular velocity such as, for example, a log-linear response to angular velocity. In example implementations, the multiplication stages can comprise one or more than one of the multipliers 155 and/or 155'

Consequently, at the multiplication stages, the multiplication results are only output if both inputs to a multiplication stage are both positive or both negative, which can be expressed as either or both of:

$$\text{out}=(\text{in\_1}*\text{in\_2})*(\text{in\_1}>0 \&\& \text{ in\_2}>0)+(\text{in\_1}*\text{in\_2})*(\text{in\_1}<0 \&\& \text{ in\_2}<0) \quad (11)$$

or $$\text{out}=(\text{in\_1}*\text{in\_2})*(\text{in\_1}*\text{in\_2}>0), \text{ where} \quad (12)$$

in_1 is a first input to a multiplier, in_2 is a second input to a multiplier, and && is a logical "and" operator.

Additionally, or alternatively, to the foregoing, example implementations can be realised that amend the ratio of the fast and slow Reichardt-Hassenstein Detectors (RHD) to a predetermined ratio. The predetermined ratio can be selected to influence at least one, or both, of clamped values and noise. In general, example implementations can be realised in which the predetermined ratio of fast to slow RHDs is given by $$\text{ratio} = \frac{\text{fast}}{\text{slow} + \alpha'''}, \quad (13)$$

where α" can take a predetermined value. Example implementations can be realised in which the predetermined value is α"=0.1. A ratio given by such a value of α" can reduce, or remove, a need for clamped values and reduce, or remove, noise. It will be appreciated that introducing the value of α" avoids any division by zero anomalies as slow tends to zero.

Additionally, or alternatively, to the foregoing, the above results in a response from the processors 124 and 126 or the detector 100 that is directional. However, example implementations can result in a magnitude of the response varying considerably depending on the angle of motion of transitions relative to a predetermined axis or axes. Therefore, example implementations such as those described above can be realised or supplemented with motion inhibitors in which horizontal and vertical components of motion are arranged to inhibit one another in a predetermined manner. Examples can be realised in which the predetermined manner comprises a division such as, for example, $$\text{horiz\_inh} = \frac{horiz}{\beta'' + \delta'' vert}, \quad (14)$$

where
horiz is the magnitude of horizontal motion, β" is a constant, δ" is a constant and vert is the magnitude of vertical motion and/or $$\text{vert\_inh} = \frac{vert}{\beta'' + \delta'' horiz}, \quad (15)$$

where
horiz is the magnitude of horizontal motion, β" is a constant, δ" is a constant and vert is the magnitude of vertical motion.

Example implementations can be realised in which β"=1 and/or δ"=0.3. Although example implementations can use β"=1 and/or δ"=0.3, implementations are not limited to those values. Example implementations can be realised that use some other values. The magnitude of the horizontal motion can be at least one, or both, of $D^l$ 128 or $D^r$ 130 and/or the magnitude of the vertical motion can be at least one, or both, of $D^d$ 132 or $D^u$ 134. Consequently, the final direction indications output by the detector 100 are horiz_inh and vert_inh. Furthermore, although the example implementations above for horiz_inh and vert_inh can use the same values of β" and/or δ", they are not limited thereto. Example implementations can be realised that in which horiz_inh and vert_inh use respective values of β" and/or δ".

Example implementations can be realised in which equations (14) and/or (15) can be realised for progressive and regressive motions on a predetermined number of axes such as, for example, one or two axes, which would give up to four variants. The performance of the variants described above is shown in FIG. 12 and FIG. 13.

Referring to FIG. 12, there is shown a performance graph 1200 according to an example implementation. The graph 1200 shows multiple instances of magnitude responses 1201 of the detector 100 given respective angles of motion of transitions 1202 to 1214 relative to an axis of the detector. For example, it can be appreciated that the transitions used had directions of motion relative to an axis of the detector of 0°, 10°, 22.5°, 45°, 67.5°, 80° and 90°. It can be appreciated that the magnitude responses are substantially the same, that is, similar within a given margin and/or are invariant relative to the angle between the direction of motion of the transitions and an axis of the detector.

Referring to FIG. 13, there is shown a graph 1300 of estimated directions of motion 1302 to 1314 given respective angles 1302' to 1314' of motion of transitions relative to an axis of the detector. It can be appreciated that there is a good correlation between the input directions of motion of the transitions and the estimated directions of motion for the transitions.

Although the examples herein use a two-axis array, examples can alternatively or additionally be implemented that use an n axis array or grid. For example, sensors arranged in a grid or array arranged hexagonally could be indexed using a triple of i,j,k. Furthermore, although the examples have been described with reference to the sensors detecting visible light, examples can alternatively or additionally be implemented that use sensors that are responsive to other wavelengths of electromagnetic waves or sound waves.

As used herein, the term "circuitry" may refer to, be part of, or include, an Application Specific Integrated Circuit (ASIC), an integrated circuit, an electronic circuit, one or more than one processor (shared, dedicated, or group), and/or memory (shared, dedicated, or group), that execute one or more software or firmware programs, a combinational logic circuit, and/or other suitable hardware components that provide the described functionality. In some examples, the circuitry may be implemented in, or functions associated with the circuitry may be implemented by, one or more software or firmware modules. In some examples, circuitry may include logic, at least partially operable in hardware. Similarly, executable instructions may comprise instructions executable by a processor or instructions implemented in at least one of hardware or software such as, for example, instructions implemented using an ASIC or other logic.

Discussions herein utilising terms such as, for example, "processing", "computing", "calculating", "determining", "establishing", "analyzing", "checking", or the like, may refer to operation(s) and/or process(es) of a processor, circuitry, logic, a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating the plural as well as the singular, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed Advantageously, example implementations can be used to realise a detector for determining motion from visual cues, said determining being invariant to changes in at least one of temporal and spatial frequencies of said visual cues.

Example Implementations can be Realised According to the Following Clauses:

Clause 1:
1. A detector for detecting motion, the detector comprising:
   a. an input interface for receiving inputs from a plurality of sensors responsive to environmental changes;
   b. processor circuitry, responsive to selected inputs of the plurality of inputs, comprising
      i. a first filter to solve a first differential equation comprising different time constants using the selected inputs, the first filter produces a zero output in response to a steady state input of the selected inputs;
      ii. a second filter, responsive to the output of the first filter, to solve a second differential equation, the second filter produces an output that is equal to the output of the first filter in a steady state;
      iii. correlator circuitry arranged to determine measures of temporally overlapping outputs from selected outputs of the second filter;
      iv. ratio determining circuitry, responsive to outputs from the correlator circuitry, for determining a ratio of selected outputs from the correlator circuitry; said ratio being associated with at least one direction of motion.

Clause 2:
2. The detector of clause 1, in which a first filter to solve a first differential equation comprising different time constants using the selected inputs comprises circuitry to solve the following differential equations:
   a. $db_{i,j}/dt=(x_{i,j}-b_{i,j})/\tau_b$ and $da_{i,j}/dt=(x_{i,j}-a_{i,j}-b_{i,j})/\tau_a$ (1)
   b. where a is the output activity of a node of the first filter, b is the adaptation activity of the node, x is the activity associated with a variation in the environment such as variation in electromagnetic waves or variation of sounds waves incident on the sensors, t is time and $\tau_a$ and $\tau_b$ are time constants.

Clause 3:
3. The detector of clause 2, wherein $\tau_b > \tau_a$.

Clause 4:
4. The detector of any of clauses 1 to 3, in which the second filter, responsive to the output of the first filter, to solve a second differential equation comprises circuitry to solve
   a. $dc_{i,j}^{[f,s,n]}/dt=(a_{i,j}-c_{i,j})/\tau_{[f,s,n]}$ (2)

b. where C is the activity of the node and the output from each node, a is the activity of the corresponding node, t is time, and $\tau_{[fsn]}$ are time constants.

Clause 5:
5. The detector of clause 4, wherein the $\tau_{[fsn]}$ time constants such that $\tau_n < \tau_f < \tau_s$.

Clause 6:
6. The detector of either of clauses 4 and 5, in which the time constants $\tau_s$ and $\tau_f$ have a predetermined relationship.

Clause 7:
7. The detector of clause 6, in which the predetermined relationship comprises a predetermined ratio.

Clause 8:
8. The detector of clause 7, in which the predetermined ratio is $\tau_s:\tau_f=3:1$.

Clause 9:
9. The detector of any preceding clause, in which correlator circuitry arranged to determine measures of temporally overlapping outputs from selected outputs of the second filter comprises processing delayed and non-delay outputs from the second filter to determine said measures of temporally overlapping outputs.

Clause 10:
10. The detector of clause 9, in which the ratio determining circuitry, responsive to outputs from the correlator circuitry, for determining a ratio of selected outputs from the correlator circuitry; said ratio being associated with at least one direction of motion comprises circuitry to determine ratios of summations of outputs from said correlator circuitry.

Clause 11:
11. The detector of clause 9, in which said circuitry to determine ratios of summations of outputs from said correlator comprises circuitry to evaluate $$RHD_K^z = \begin{cases} \sum_K F^z + \sum_K S^z - \sum_K F^{z'} - \sum_K S^{z'} & \text{if } \sum_K F^z + \sum_K S^z - \sum_K F^{z'} - \sum_K S^{z'} > 0 \\ 0 & \text{if } \sum_K F^z + \sum_K S^z - \sum_K F^{z'} - \sum_K S^{z'} \leq 0 \end{cases}$$

and $$D_N^z = \begin{cases} \sum_K F^z / \sum_K S^z - v\sum_K RHD^z & \text{if } \sum_K F^z > \sum_K F_{min} \text{ and } S^r > S_{min} \\ \sum_K F_{min} / \sum_K S^z - v\sum_K RHD^z & \text{if } \sum_K F^z \leq \sum_K F_{min} \text{ and } S^r > S_{min} \\ \sum_K F^z / \sum_K S_{min} - v\sum_K RHD^z & \text{if } \sum_K F^z > \sum_K F_{min} \text{ and } S^r \leq S_{min} \\ \sum_K F_{min} / \sum_K S_{min} - v\sum_K RHD^z & \text{if } \sum_K F^z \leq \sum_K F_{min} \text{ and } S^r \leq S_{min} \end{cases}$$

where $z=\{u,d,l,r\}$ and $z'=\{d,u,r,l\}$ for any set of points $K=k_{aa}, k_{bb}, \ldots, k_{zz}$ selected from the sensors, V is a scaling factor, $F_{min}$ and $S_{min}$ are lower bounds for a selected number, N, of sensor outputs.

Clause 12:
12. The detector of clause 11, in which V has a predetermined value.

Clause 13:
13. The detector of clause 12, in which v□1.

Clause 14:
14. The detector of any of clause 11 to 14, in which $F_{min}$ and $S_{min}$ have a predetermined relationship.

Clause 15:
15. The detector of clause 14, in which the predetermined relationship influences the effect of noise detected by the sensors.

Clause 16:
16. The detector of either of clauses 14 and 15, in which the predetermined relationship is $F_{min}=\alpha S_{min}$.

Clause 17:
17. The detector of clause 16, in which $\alpha=0.1$.

Clause 18:
18. A method of detecting motion, the method comprising:
  a. receiving inputs from a plurality of sensors responsive to changes in electromagnetic waves or sound waves;
  b. selecting inputs of the plurality of inputs,
  c. filtering, using a first filter, the selected inputs to solve a first differential equation comprising different time constants, the first filter to produce a zero output in response to a steady state input of the selected inputs;
  d. filtering, using a second filter, using outputs of the first filter, to solve a second differential equation, the second filter to produce an output that is equal to the output of the first filter in a steady state;
  e. determining, using correlator circuitry, measures of temporally overlapping outputs from selected outputs of the second filter,
  f. establishing, using ratio determining circuitry, a ratio of selected outputs from the correlator circuitry; said ratio being associated with at least one direction of motion.

Clause 19:
19. The method of clause 18, in which the filtering, using a first filter, comprises solving the following differential equations:

a. $db_{i,j}/dt=(x_{i,j}-b_{i,j})/\tau_b$ and $da_{i,j}/dt=(x_{i,j}-a_{i,j}-b_{i,j})/\tau_a$ (1)

b. where a is the output activity of a node of the first filter, b is the adaptation activity of the node, x is the activity associated with a variation in the electromagnetic waves incident on the sensors, t is time and $\tau_a$ and $\tau_b$ are time constants.

Clause 20:
20. The method of clause 18, wherein $\tau_b > \tau_a$.

Clause 21:
21. The method of any of clauses 18 to 20, in which the filtering, using the second filter, comprises solving a second differential equation comprises circuitry to solve a. $dc_{i,j}^{[f,s,n]}/dt=(a_{i,j}-c_{i,j})/\tau_{[f,s,n]}$ (2)

b. where C is the activity of the node and the output from each node, a is the activity of the corresponding node, t is time, and $\tau_{[fsn]}$ are time constants.

Clause 22:
22. The method of clause 21, wherein the $\tau_{[fsn]}$ time constants such that Clause 23:
23. The method of either of clauses 21 and 22, in which the time constants $\tau_s$ and $\tau_f$ have a predetermined relationship.

Clause 24:
24. The method of clause 23, in which the predetermined relationship comprises a predetermined ratio.

Clause 25:
25. The method of clause 24, in which the predetermined ratio is $\tau_s:\tau_f=3:1$.

Clause 26:
26. The method of any preceding clause, in which determining, said correlator circuitry, measures of temporally overlapping outputs from selected outputs of the second filter comprises processing delayed and non-delay outputs from the second filter to determine said measures of temporally overlapping outputs.

Clause 27:
27. The method of clause 26, in which said determining, using the ratio determining circuitry, a ratio of selected outputs from the correlator circuitry; said ratio being associated with at least one direction of motion comprises determining ratios of summations of outputs from said correlator circuitry.

Clause 28:
28. The method of clause 27, in which said determining ratios of summations of outputs from said correlator comprises evaluating $$RHD_K^z = \begin{cases} \sum_K F^z + \sum_K S^z - \sum_K F^{z'} - \sum_K S^{z'} & \text{if } \sum_K F^z + \sum_K S^z - \sum_K F^{z'} - \sum_K S^{z'} > 0 \\ 0 & \text{if } \sum_K F^z + \sum_K S^z - \sum_K F^{z'} - \sum_K S^{z'} \leq 0 \end{cases}$$

and $$D_N^z = \begin{cases} \sum_K F^z / \sum_K S^z - v \sum_K RHD^z & \text{if } \sum_K F^z > \sum_K F_{min} \text{ and } S^r > S_{min} \\ \sum_K F_{min} / \sum_K S^z - v \sum_K RHD^z & \text{if } \sum_K F^z \leq \sum_K F_{min} \text{ and } S^r > S_{min} \\ \sum_K F^z / \sum_K S_{min} - v \sum_K RHD^z & \text{if } \sum_K F^z > \sum_K F_{min} \text{ and } S^r \leq S_{min} \\ \sum_K F_{min} / \sum_K S_{min} - v \sum_K RHD^z & \text{if } \sum_K F^z \leq \sum_K F_{min} \text{ and } S^r \leq S_{min} \end{cases}$$

where $z=\{u,d,l,r\}$ and $z'=\{d,u,r,l\}$ for any set of points $K=k_{aa}, k_{bb}, \ldots, k_{zz}$ selected from the sensors, v is a scaling factor, $F_{min}$ and $S_{min}$ are lower bounds for a selected number, N, of sensor outputs.

Clause 29:
29. The method of clause 28, in which V has a predetermined value.

Clause 30:
30. The method of clause 29, in which v□1.

Clause 31:
31. The method of any of clause 28 to 30, in which $F_{min}$ and $S_{min}$ have a predetermined relationship.

Clause 32:
32. The method of clause 31, in which the predetermined relationship influences the effect of noise detected by the sensors.

Clause 33:
33. The method of either of clauses 31 and 32, in which the predetermined relationship is $F_{min}=\alpha S_{min}$.

Clause 34:
34. The method of clause 33, in which $\alpha=0.1$.

Clause 35:
35. Machine executable instructions, arranged, when executed or implemented, to implement a method of any of clauses 18 to 34.

Clause 36:
36. Machine readable storage storing machine executable instructions of clause 35.

The invention claimed is:

1. A detector for detecting motion, the detector comprising:
   an input interface for receiving inputs from a plurality of sensors responsive to environmental changes;
   processor circuitry, responsive to selected inputs of a plurality of inputs, comprising:
      a first filter to produce a plurality of first outputs, the plurality of first outputs being zero in response to a steady state of the selected inputs, wherein the first filter comprises a first circuitry to solve, using the selected inputs, first differential equations comprising first time constants;
      a second filter, responsive to the plurality of first outputs of the first filter, to produce a plurality of second outputs, each output of the plurality of second outputs being equal to a corresponding output of the plurality of first outputs of the first filter in the steady state, wherein the second filter comprises a second circuitry to solve, using the selected inputs, second differential equations comprising second time constants;
      a correlator circuitry arranged to determine measures of temporally overlapping outputs from selected outputs of the plurality of second outputs of the second filter,
      wherein the correlator circuitry is configured to process delayed and non-delayed outputs from the selected outputs of the plurality of second outputs of the second filter to determine said measures of temporally overlapping outputs;
      a ratio determining circuitry, responsive to outputs from the correlator circuitry, is arranged to determine a ratio of selected outputs from the correlator circuitry, wherein the ratio of selected outputs is associated with at least one direction of motion,
      wherein the ratio determining circuitry is arranged to determine ratios of summations of outputs from said correlator circuitry based on the ratio of selected outputs; and
      wherein the ratio determining circuitry is arranged to evaluate $$RHD_K^z = \begin{cases} \dfrac{\sum_K F^z + \sum_K S^z - \sum_K F^{z'} - \sum_K S^{z'}}{\sum_K F^z + \sum_K S^z} & \text{if } \sum_K F^z - \sum_K S^{z'} > 0 \\ 0 & \text{if } \sum_K F^z + \sum_K S^z - \sum_K F^{z'} - \sum_K S^{z'} \leq 0 \end{cases}$$

and $$D_N^z = \begin{cases} \dfrac{\sum_K F^z / \sum_K S^z -}{v \sum_K RHD^{z'}} & \text{if } \sum_K F^z > \sum_K F_{min} \text{ and } S^r > S_{min} \\ \dfrac{\sum_K F_{min} / \sum_K S^z -}{v \sum_K RHD^{z'}} & \text{if } \sum_K F^z \leq \sum_K F_{min} \text{ and } S^r > S_{min} \\ \dfrac{\sum_K F^z / \sum_K S_{min} -}{v \sum_K RHD^{z'}} & \text{if } \sum_K F^z > \sum_K F_{min} \text{ and } S^r \leq S_{min} \\ \dfrac{\sum_K F_{min} / \sum_K S_{min} -}{v \sum_K RHD^{z'}} & \text{if } \sum_K F^z \leq \sum_K F_{min} \text{ and } S^r \leq S_{min} \end{cases}$$

where $z=\{u,d,l,r\}$ and $z'=\{d,u,r,l\}$ for any set of points $K=k_{aa}, k_{bb}, \ldots, k_{zz}$ selected from the plurality of sensors, v is a scaling factor, $F_{min}$ and $S_{min}$ are lower bounds for a selected number, N, of sensor outputs.

2. The detector of claim 1, wherein the second filter, in responsive response to the plurality of first outputs of the first filter, is adapted to solve a second differential equation comprises the second circuitry to solve $$dc_{i,j}^{[f,s,n]}/dt=(a_{i,j}-c_{i,j})\tau_{[f,s,n]}$$

where c is an activity of a node and an output from each node, a is an activity of a corresponding node, t is time, and $\tau_{[f,s,n]}$ are time constants.

3. The detector of claim 2, wherein the $\tau_{[f,s,n]}$ time constants are such that $$\tau_n < \tau_f < \tau_s.$$

4. The detector of claim 3, wherein the time constants $\tau_s$ and $\tau_f$ have a predetermined relationship, wherein the predetermined relationship comprises a predetermined ratio.

5. The detector of claim 4, wherein the predetermined ratio is $\tau_s:\tau_f=3:1$.

6. The detector of claim 1, wherein v has a predetermined value.

7. The detector of claim 6, wherein v>>1.

8. The detector of claim 7, wherein $F_{min}$ and $S_{min}$ have a predetermined relationship.

9. The detector of claim 8, wherein the predetermined relationship influences an effect of noise detected by the plurality of sensors.

10. The detector of claim 9, in which the predetermined relationship is $F_{min}=\alpha S_{min}$.

11. The detector of claim 10, in which $\alpha=0.1$.

12. A method of detecting motion, the method comprising:
receiving a plurality of inputs from a plurality of sensors responsive to changes in electromagnetic waves or sound waves;
selecting inputs of the plurality of inputs;
filtering, using a first filter, the selected inputs to produce a plurality of first outputs, the plurality of first outputs being zero in response to a steady state of the selected inputs;
filtering, using a second filter, using the plurality of first outputs of the first filter, to produce a plurality of second outputs, each output of the plurality of second outputs is equal to a corresponding output of the plurality of first outputs of the first filter in the steady state;
determining, using correlator circuitry, measures of temporally overlapping outputs from selected outputs of the plurality of second outputs of the second filter;
establishing, using ratio determining circuitry, a ratio of selected outputs from the correlator circuitry, said ratio is associated with at least one direction of motion;
determining, using sublayers of said ratio determining circuitry, ratios of summations from said ratio; and
wherein said determining ratios of summations comprises evaluating $$RHD_K^z = \begin{cases} \sum_K F^z + \sum_K S^z - \sum_K F^{z'} - \sum_K S^{z'} & \text{if } \sum_K F^z + \sum_K S^z - \sum_K F^{z'} - \sum_K S^{z'} > 0 \\ 0 & \text{if } \sum_K F^z + \sum_K S^z - \sum_K F^{z'} - \sum_K S^{z'} \leq 0 \end{cases} \text{ and}$$

$$D_N^z = \begin{cases} \sum_K F^z / \sum_K S^z - v \sum_K RHD^{z'} & \text{if } \sum_K F^z > \sum_K F_{min} \text{ and } S^r > S_{min} \\ \sum_K F_{min} / \sum_K S^z - v \sum_K RHD^{z'} & \text{if } \sum_K F^z \leq \sum_K F_{min} \text{ and } S^r > S_{min} \\ \sum_K F^z / \sum_K S_{min} - v \sum_K RHD^{z'} & \text{if } \sum_K F^z > \sum_K F_{min} \text{ and } S^r \leq S_{min} \\ \sum_K F_{min} / \sum_K S_{min} - v \sum_K RHD^{z'} & \text{if } \sum_K F^z \leq \sum_K F_{min} \text{ and } S^r \leq S_{min} \end{cases}$$

where $z=\{u,d,l,r\}$ and $z'=\{d,u,r,l\}$ for any set of points $K=k_{aa}, k_{bb}, \ldots, k_{zz}$ selected from the plurality of sensors, v is a scaling factor, $F_{min}$ and $S_{min}$ are lower bounds for a selected number, N, of sensor outputs.

13. The method of claim 12, wherein the sublayers are associated with applying reichardt-Hassenstein implementation in computing the ratios of summations.

14. A detector for detecting motion, the detector comprising:
an input interface for receiving a plurality of inputs from a plurality of sensors responsive to environmental changes in electromagnetic waves or sound waves;
processor circuitry, responsive to selected inputs of the plurality of inputs, comprising:
a first filter to produce a plurality of first outputs, the plurality of first outputs being zero in response to a steady state of the selected inputs, wherein the first filter comprises a circuitry to solve, using the selected inputs, differential equations comprising time constants with different relative values;
a second filter, responsive to the plurality of first outputs of the first filter, to produce a plurality of second outputs, each output of the plurality of second outputs being equal to a corresponding output of the plurality of first outputs of the first filter in the steady state;
a correlator circuitry arranged to determine measures of temporally overlapping outputs from selected outputs of the plurality of second outputs of the second filter;
a ratio determining circuitry, responsive to outputs from the correlator circuitry, is arranged to determine a ratio of selected outputs from the correlator circuitry, wherein said ratio is associated with at least one direction of motion; and
wherein said differential equations comprise:

$$db_{i,j}/dt=(x_{i,j}-b_{i,j})/\tau_b \text{ and } da_{i,j}/dt=(x_{i,j}-a_{i,j}-b_{i,j})/\tau_a$$

where a is an output activity of a node of the first filter, b is an adaptation activity of the node, x is an activity associated with a variation in an environment on the plurality of sensors, t is time and $\tau_a$ and $\tau_b$ are time constants.

15. The detector of claim 14, wherein $\tau_b > \tau_a$.

* * * * *

UNITED STATES PATENT AND TRADEMARK OFFICE
CERTIFICATE OF CORRECTION

PATENT NO. : 12,020,567 B2  
APPLICATION NO. : 17/507420  
DATED : June 25, 2024  
INVENTOR(S) : Alex Cope Page 1 of 1

It is certified that error appears in the above-identified patent and that said Letters Patent is hereby corrected as shown below:

In the Specification

In Column 5 Line 13, Column 18 Line 62, Column 18 Line 66, and Column 21 Line 6, "V" should read --$v$--.

In Column 5 Line 21, "v=10" should read --$v=10$--.

In Column 5 Line 22, "v=0" should read --$v=0$--.

In Column 5 Line 20, Column 19 Line 2, and Column 21 Line 9, "v☐1" should read --$v \gg 1$--.

In the Claims

In Column 22 Line 48 (Claim 2), "responsive" should be deleted.

In Column 23 Line 66 (Claim 13), "reichardt-Hassenstein" should read --Reichardt-Hassenstein--.

Signed and Sealed this  
Eighth Day of October, 2024

Katherine Kelly Vidal  
*Director of the United States Patent and Trademark Office*